US012417641B2

(12) United States Patent
Bogacki et al.

(10) Patent No.: US 12,417,641 B2
(45) Date of Patent: Sep. 16, 2025

(54) METHOD AND APPARATUS FOR DETERMINING THE SPEED OF A VEHICLE TRAVELLING ALONG A ROAD BY PROCESSING IMAGES OF THE ROAD

(71) Applicant: APTIV TECHNOLOGIES LIMITED, St. Michael (BB)

(72) Inventors: Piotr Bogacki, Cracow (PL); Rafal Dlugosz, Lubon (PL); Marzena Banach, Puszczykowo (PL)

(73) Assignee: Aptiv Technologies AG, Schaffhausen (CH)

( * ) Notice: Subject to any disclaimer, the term of this patent is extended or adjusted under 35 U.S.C. 154(b) by 390 days.

(21) Appl. No.: 17/942,406

(22) Filed: Sep. 12, 2022

(65) Prior Publication Data
US 2023/0083262 A1 Mar. 16, 2023

(30) Foreign Application Priority Data

Sep. 10, 2021 (EP) ..................................... 21195989

(51) Int. Cl.
*G06V 20/58* (2022.01)
*G06T 7/12* (2017.01)
(Continued)

(52) U.S. Cl.
CPC ............... *G06V 20/58* (2022.01); *G06T 7/73* (2017.01); *G06V 10/443* (2022.01); *G06T 2207/30252* (2013.01)

(58) Field of Classification Search
CPC .... G06V 20/58; G06V 10/443; G06V 30/189; G06V 20/588; G06T 7/73;
(Continued)

(56) References Cited

U.S. PATENT DOCUMENTS 9,607,220 B1 3/2017 Smith
10,176,386 B2 * 1/2019 Rao .......................... G01S 11/12
(Continued)

FOREIGN PATENT DOCUMENTS

KR 20000066736 A 11/2000

OTHER PUBLICATIONS

M. Revilloud, D. Gruyer and E. Pollard, "An improved approach for robust road marking detection and tracking applied to multi-lane estimation," 2013 IEEE Intelligent Vehicles Symposium (IV), Gold Coast, QLD, Australia, 2013, pp. 783-790, doi: 10.1109/IVS.2013.6629562. (Year: 2013).*

(Continued)

*Primary Examiner* — Chineyere Wills-Burns
*Assistant Examiner* — Lucius Cameron Gree Allen
(74) *Attorney, Agent, or Firm* — Miller Johnson

(57) ABSTRACT

An apparatus for determining a speed of a vehicle along a road by processing a first image and a second image of the road captured by a camera on the vehicle and comprising respective road marker images of a road marker, the apparatus arranged to: determine a location of the road marker in the first image; predict a location of the road marker in the second image based on the determined location, an estimate of the vehicle speed, and a time period between capture of the images; detect the road marker in a portion of the second image at the predicted location; estimate a distance moved by the vehicle during the time period based on the determined location, and a location of the detected road marker in the portion of the second image; and calculate the speed based on the estimated distance and the time period.

14 Claims, 19 Drawing Sheets

(51) Int. Cl.
  *G06T 7/168* (2017.01)
  *G06T 7/246* (2017.01)
  *G06T 7/73* (2017.01)
  *G06V 10/44* (2022.01)
  *G06V 20/56* (2022.01)
  *G06V 30/186* (2022.01)

(58) Field of Classification Search
  CPC . G06T 2207/30252; G06T 7/12; G06T 7/168; G06T 2207/20064; G06T 7/246; G06T 2207/30256
  USPC .......................................................... 382/103
  See application file for complete search history.

(56) References Cited

U.S. PATENT DOCUMENTS

| | | | | |
|---|---|---|---|---|
| 10,832,418 | B1* | 11/2020 | Karasev | G06T 7/579 |
| 10,998,432 | B2 | 5/2021 | Nagata | |
| 2009/0046897 | A1* | 2/2009 | Rowsell | G06V 20/54 382/107 |
| 2019/0272435 | A1* | 9/2019 | Kundu | G06V 20/588 |
| 2021/0209941 | A1* | 7/2021 | Maheshwari | G06V 20/588 |
| 2021/0262808 | A1* | 8/2021 | Wang | G06V 20/588 |

OTHER PUBLICATIONS

Slimani, Ibtissam & Zaarane, Abdelmoghit & Hamdoun, A. & Issam, Atouf. (2018). Traffic surveillance system for vehicle detection using discrete wavelet transform. Journal of Theoretical and Applied Information Technology. 96. 5905-5917. (Year: 2018).*

Stein GP et al: "Vision-based ACC with a Single Camera: Bounds on Range and Range Rate Accuracy", Proc. IEEE Intelligent Vehicle Symposium, 2003, Jun. 9, 2003 (Jun. 9, 2003), pp. 120-125, XP010645861, ISBN: 978-0-7803-7848, pp. 121-122.

Nourani-Vatani Net Al: "Practical Visual Odometry for Car-Like Vehicles", 2009 IEEE International Conference On Robotics and Automation: (ICRA) ; Kobe, Japan, May 12-17, 2009, IEEE, Piscataway, NJ, USA, May 12, 2009 (May 12, 2009), pp. 3551-3557, XP031509637, ISBN: 978-1-4244-2788-8, p. 3552.

Chen Yu-Chun et al: "Integrated Vehicle and Lane Detection with Distance Estimation" In: "Pattern Recognition: 5th Asian Conference, ACPR 2019, Auckland, New Zealand, Nov. 26-29, 2019, Revised Selected Papers, Part II", Jan. 1, 2015 (Jan. 1, 2015), Springer International Publishing, Cham, XP055893851, ISSN: 0302-9743 ISBN: 978-3-030-41298-2 vol. 9010, pp. 473-485, retrieved from the Internet: URL:http://vigir.missouri.edu/-gdesouza/Research/Conference_CDs/ACCV 2014/pages/work shopl4/pdffiles/w14-pll.pdf>.

European Search Report issued by the European Patent Office in connection with European Patent Application No. EP 21 19 5989 dated Mar. 16, 2022 (12 pages).

Communication received for EP21195989.5 dated Apr. 28, 2025, 10 pages.

* cited by examiner $F = 1 : [1\ 1] / 2^F$
$F = 2 : [1\ 2\ 1] / 2^F$
$F = 3 : [1\ 3\ 3\ 1] / 2^F$
$F = 4 : [1\ 4\ 6\ 4\ 1]/2^F$
$F = 5 : [1\ 5\ 10\ 10\ 5\ 1] / 2^F$
$F = 6 : [1\ 6\ 15\ 20\ 15\ 6\ 1] / 2^F$
$F = 7 : [1\ 7\ 21\ 35\ 35\ 21\ 7\ 1] / 2^F$

510

$F = 1 : [1\ \text{-}1] / 2^F$
$F = 2 : [1\ \text{-}2\ 1] / 2^F$
$F = 3 : [1\ \text{-}3\ 3\ \text{-}1] / 2^F$
$F = 4 : [1\ \text{-}4\ 6\ \text{-}4\ 1]/2^F$
$F = 5 : [1\ \text{-}5\ 10\ \text{-}10\ 5\ \text{-}1] / 2^F$
$F = 6 : [1\ \text{-}6\ 15\ \text{-}20\ 15\ \text{-}6\ 1] / 2^F$
$F = 7 : [1\ \text{-}7\ 21\ \text{-}35\ 35\ \text{-}21\ 7\ \text{-}1] / 2^F$

METHOD AND APPARATUS FOR DETERMINING THE SPEED OF A VEHICLE TRAVELLING ALONG A ROAD BY PROCESSING IMAGES OF THE ROAD

CROSS-REFERENCE TO RELATED APPLICATION

This application claims the benefit of European patent application serial number EP21195989.5 filed on Sep. 10, 2021. The entire contents of which are hereby incorporated by reference herein.

TECHNICAL FIELD

Example aspects herein generally relate to the field of image processing and, more particularly, to the processing of digital images acquired by a vehicle-mounted camera.

BACKGROUND

The capability to detect an area of a road that is unoccupied by vehicles or other objects is useful in many active safety (AS) technologies. The detection of road occupancy lies at the heart of many active safety functions, such as lateral control (LC) and lane change assist (LCA), for example. Furthermore, the detection of lanes via road markers such as Botts' dots (BDs), is used in many active safety functions such as lane departure warning (LDW), traffic jam assist (TJA), and adaptive cruise control (ACC). Equipping vehicles with the LDW function is currently a requirement, for example, during the Euro New Car Assessment Program (NCAP) tests. Over the past few years, there has been a great desire to develop these technologies.

SUMMARY

The present inventors have devised a method of determining the speed of a vehicle travelling along a road, by processing images of the road that have been captured by a camera mounted on the vehicle. The method can allow an independent determination of the vehicle's speed to be made in a computationally efficient manner, and has been found to be capable of reliably determining the vehicle's speed based on images acquired at different times of day that have widely varying lighting and contrast conditions.

More particularly, the present inventors have devised, in accordance with a first aspect herein, a method of determining a speed of a vehicle travelling along a road by processing pairs of images of the road that have been captured by a camera mounted on the vehicle, each of the pairs of images having a common image coordinate system and comprising a first image of the road and a second image of the road, the first image having been captured at a first time instant, and the second image having been captured at a second time instant that is a predefined time period after the first time instant, wherein the first image and the second image comprise respective road marker images of a road marker on the road. The method comprises processing each of the pairs of images by: determining a location, in the image coordinate system, of the road marker image in the first image; predicting a location, in the image coordinate system, of an image of the road marker in the second image based on the determined location of the road marker image, an estimate of the speed of the vehicle, and the predefined time period; detecting an image of the road marker in a portion of the second image at the predicted location; estimating a distance by which the vehicle has travelled along the road during the predefined time period based on the determined location of the road marker in the first image, and a location of the detected image of the road marker in the portion of the second image; and calculating the speed of the vehicle based on the estimated distance and the predefined time period.

In the above method, a calculation consisting of a cross-correlation between a portion of the first image at the determined location and a portion of the second image at the predicted location may be performed, and a result of the calculation may be used to detect, and determine the location of, the image of the road marker in the portion of the second image, and estimate the distance by which the vehicle has travelled along the road during the predefined time period.

The estimate of the speed of the vehicle, which is used to predict the location of the image of the road marker in the second image during processing of a pair of the pairs of images, may be a speed of the vehicle measured by a speedometer of the vehicle, or alternatively a speed of the vehicle calculated during the processing of one of the pairs of images previously captured by the camera.

The predicted location of the image of the road marker in the second image may be predicted using a mapping between a first variable, which is indicative of a position in the image coordinate system of a portion of the image, and second variable, which is indicative of a distance from the vehicle of a portion of the road represented by the portion of the image.

Alternatively, the distance by which the vehicle has travelled along the road during the predefined time period may be estimated using a mapping between a first variable, which is indicative of a position in the image coordinate system of a portion of the image, and second variable, which is indicative of a distance from the vehicle of a portion of the road represented by the portion of the image. The distance by which the vehicle has travelled along the road during the predefined time period may be estimated by: determining, using the determined location of the road marker image in the first image and the mapping, a first value indicative of a distance from the vehicle of a portion of the road represented by the determined location of the road marker image in the first image; determining, using the determined location of the road marker image in the second image and the mapping, a second value indicative of a distance from the vehicle of a portion of the road represented by the determined location of the road marker image in the second image; and estimating the distance by which the vehicle has travelled along the road during the predefined time period using the first value and the second value. The predicted location of the image of the road marker in the second image may also be predicted using the mapping.

The camera may be arranged to capture, as the images, images of the road to a side of the vehicle as the vehicle travels along the road, in which case the mapping is a linear mapping. Alternatively, the camera may be arranged to capture, as the images, images of the road behind or ahead of the vehicle as the vehicle travels along the road, in which case the mapping is a non-linear mapping.

The mapping may be a polynomial relating the first variable to the second variable, a look-up table relating the first variable to the second variable, or a polyline relating the first variable to the second variable.

The location of the road marker image in the first image may be determined by: generating an LL sub-band image of an $M^{th}$ level of an (M+1)-level discrete wavelet transform, DWT, decomposition of the first image by iteratively low-pass filtering and down-sampling the first image M times, where M is an integer equal to or greater than one; generating a sub-band image of a (M+1)th level of the (M+1) level DWT decomposition of the first image by high-pass filtering the LL sub-band image of the $M^{th}$ level, and down-sampling a result of the high-pass filtering; generating boundary data indicative of a boundary of the road marker image of the first image, by determining a boundary of a region of pixels of the sub-band image of the (M+1)th level, the region of pixels being surrounded by pixels of substantially different pixel values to the pixel values of the pixels in the region; and determining the location of the road marker image in the first image by upscaling the boundary data of the region of pixels of the sub-band image of the $(M+1)^{th}$ level by a factor of $2^{M+1}$.

A first low-pass filter having a first sequence of filter coefficients that are symmetrical may be used in at least one iteration of the iterative process.

The filter coefficients in the first sequence of filter coefficients may be set to values in a row of Pascal's triangle having the same number of values as an order of the first low-pass filter.

The high-pass filtering used to generate the sub-band image of the $(M+1)^{th}$ level may comprise applying a high-pass filter having a second sequence of filter coefficients that are symmetrical. Furthermore, alternate filter coefficients in the second sequence of filter coefficients may be set to correspondingly located values in a row of Pascal's triangle having the same number of values as an order of the high-pass filter, and each remaining filter coefficient in the second sequence of filter coefficients may be set to a value obtained by multiplying a correspondingly located value in the row of Pascal's triangle by −1.

The sub-band image of the $(M+1)^{th}$ level of the (M+1)-level DWT decomposition may be one of an LH sub-band image, an HL sub-band image, and an HH sub-band image.

In an embodiment, generating the sub-band image of the $(M+1)^{th}$ level of the (M+1)-level DWT decomposition of the first image may comprise generating an LH sub-band image of the $(M+1)^{th}$ level of the (M+1)-level DWT decomposition of the first image by: generating a low-pass filtered LL sub-band image by applying a row kernel across the rows of the LL sub-band image of the $M^{th}$ level, the row kernel corresponding to a low-pass filter; down-sampling the columns of the low-pass filtered LL sub-band image by a factor of two to generate a down-sampled sub-band image; generating a high-pass filtered LL sub-band image by applying a column kernel across the columns of the down-sampled sub-band image, the column kernel corresponding to a high-pass filter; and down-sampling the rows of the high-pass filtered LL sub-band image by a factor of two to generate the LH sub-band image of the $(M+1)^{th}$ level.

In a first variant of the embodiment, generating the sub-band image of the $(M+1)^{th}$ level of the (M+1)-level DWT decomposition of the image may comprise generating an LH sub-band image of the $(M+1)^{th}$ level of the DWT decomposition of the image by: generating a high-pass filtered LL sub-band image by applying a column kernel across the columns of the LL sub-band image of the $M^{th}$ level, the column kernel corresponding to a high-pass filter; down-sampling the rows of the high-pass filtered LL sub-band image by a factor of two to generate a down-sampled sub-band image; generating a low-pass filtered sub-band image by applying a row kernel across the rows of the down-sampled sub-band image of the $M^{th}$ level, the row kernel corresponding to a low-pass filter; and down-sampling the columns of the low-pass filtered sub-band image by a factor of two to generate the LH sub-band image of the $(M+1)^{th}$ level.

In a second variant of the embodiment, generating the sub-band image of the $(M+1)^{th}$ level may comprise generating an LH sub-band image of the $(M+1)^{th}$ level of the (M+1)-level DWT decomposition of the image by: generating a filtered sub-band image by applying a two-dimensional kernel across the LL sub-band image of the $M^{th}$ level, the two-dimensional kernel being separable into a product of a row kernel and a column kernel, the row-kernel defining a low-pass filter and the column kernel defining a high pass filter; and down-sampling rows and the columns of the filtered sub-band image by a factor of two.

The road marker may be a Botts' dot, and the sub-band image of the $(M+1)^{th}$ level of the (M+1)-level DWT decomposition may be an LH sub-band image of the $(M+1)^{th}$ level of the (M+1)-level DWT decomposition.

The boundary data may be generated by: determining, in the sub-band image of the $(M+1)^{th}$ level, a pixel location of a pixel whose pixel value exceeds a predetermined threshold; and executing a contour tracing algorithm using the determined pixel to identify the boundary of the region of pixels, wherein the boundary separates pixels of the region which are adjacent to the boundary and have pixel values above the predetermined threshold, from pixels outside the region which are adjacent to the boundary and have pixel values below the predetermined threshold.

In addition, the present inventors have devised, in accordance with a second aspect herein, a computer program comprising computer-readable instructions which, when executed by a processor, cause the processor to execute a method as set out above.

Furthermore, the present inventors have devised, in accordance with a third aspect herein, an apparatus for determining a speed of a vehicle travelling along a road by processing pairs of images of the road that have been captured by a camera mounted on the vehicle, each of the pairs of images having a common image coordinate system and comprising a first image of the road and a second image of the road, the first image having been captured at a first time instant, and the second image having been captured at a second time instant that is a predefined time period after the first time instant, wherein the first image and the second image comprise respective road marker images of a road marker on the road. The apparatus comprises: a location determination module arranged to determine a location, in the image coordinate system, of the road marker image in the first image; a location prediction module arranged to predict a location, in the image coordinate system, of an image of the road marker in the second image based on the determined location of the road marker image, an estimate of the speed of the vehicle, and the predefined time period; a road marker image detection module arranged to detect an image of the road marker in a portion of the second image at the predicted location; a distance estimation module arranged to estimate a distance by which the vehicle has travelled along the road during the predefined time period based on the determined location of the road marker in the first image, and a location of the detected image of the road marker in the portion of the second image; and a speed calculation module arranged to calculate the speed of the vehicle based on the estimated distance and the predefined time period.

BRIEF DESCRIPTION OF THE DRAWINGS

Embodiments will now be explained in detail, by way of non-limiting example only, with reference to the accompanying figures described below. Like reference numerals appearing in different ones of the figures can denote identical or functionally similar elements, unless indicated otherwise.

FIG. 5 illustrates examples of low-pass filters and high-pass filters of different filter orders used in the embodiment, which have filter coefficients set in accordance with values in a row of Pascal's triangle.

DESCRIPTION OF EMBODIMENTS

Figure 1:
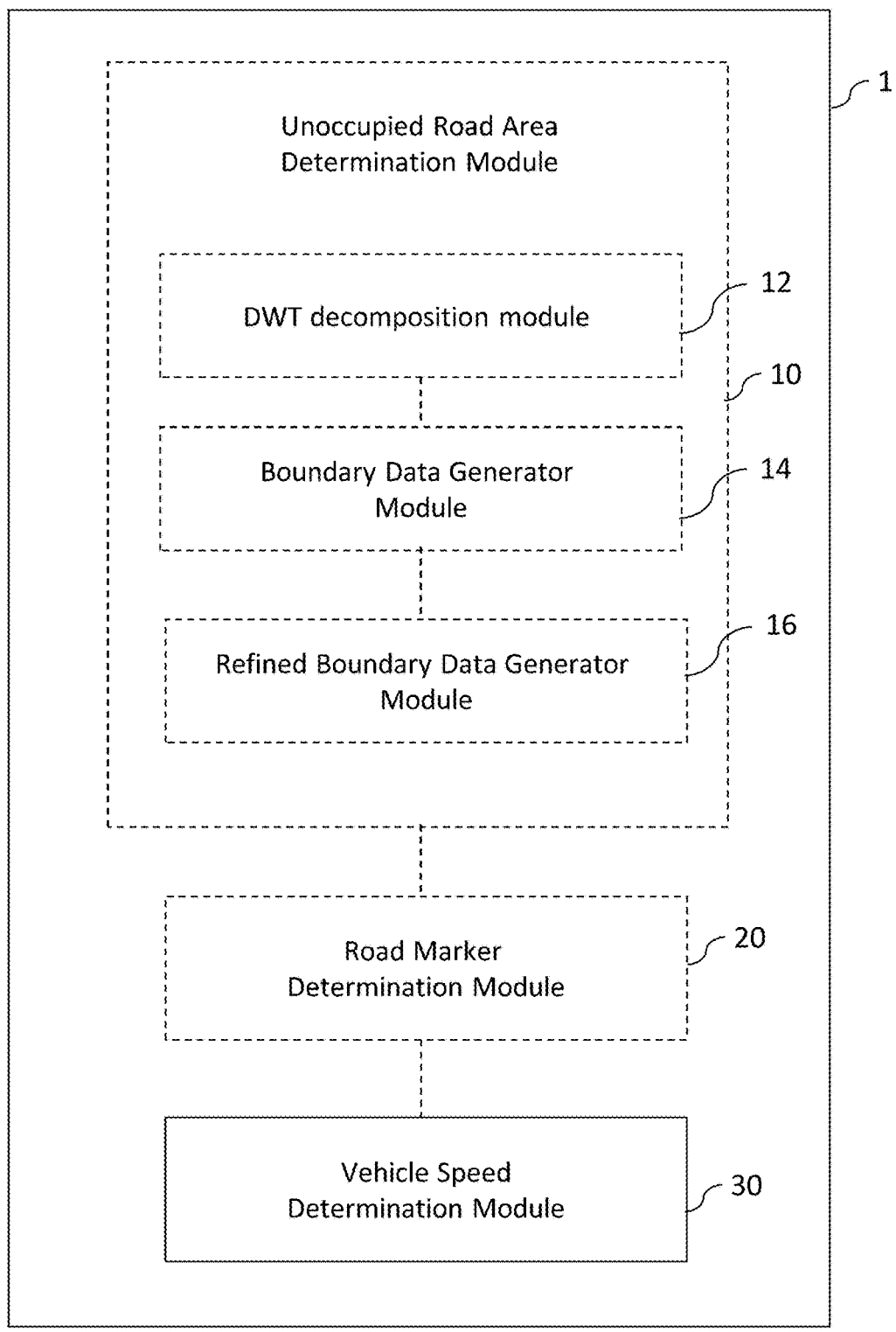
FIG. 1 is a schematic illustration of an apparatus for processing images captured by a vehicle-mounted camera, in accordance with an embodiment.

The image processing method described herein is based on the discrete wavelet transform (DWT), by which an image can be decomposed into its composite frequency components for analysis. In a typical application of DWT for image processing, after computing the DWT of an input image, a reconstruction phase is employed to reconstruct original image. To reconstruct the original signal (or a denoised version of the original signal, if image denoising is carried out on the sub-band images before the reconstruction phase), orthogonal filter banks comprising orthogonal filters corresponding to orthogonal wavelets are required. However, implementing orthogonal filter banks using orthogonal wavelets, such as those derived from the Daubechies wavelet, for example, makes the DWT decomposition process computationally expensive to implement, due to the presence of the complex filter coefficients that are required to implement these filters. This is problematic in real-time image recognition systems, in which processing power is often limited and high-speed feature detection is required.

The image processing method herein includes some modifications to the DWT approach set out above, which are made possible by properties of the image being processed, and which allow simplifications and consequent advantages set out above to be attained.

More particularly, the inventors have found that, in DWT sub-band images that are generated by the action of at least one high-pass filter, low spatial frequency components of the input image, which correspond to an unoccupied area of the road in the image, can be effectively removed, leaving in its place a substantially dark region of the sub-band image whose boundary can be easily demarcated using the boundary-finding algorithms described herein. The removal of these low-frequency components can enhance the contrast regardless of the lighting conditions under which the image was captured by the camera. The combination of image processing operations describe herein can make the overall procedure robust against varying noise and lighting conditions.

As no reconstruction of the original signal is required in the image processing method described herein, it is unnecessary to ensure orthogonality of the analysis filter bank. This allows greater freedom in selecting the structures of the filters and, in particular, allows the DWT decomposition to be implemented using symmetrical, integer-valued filters, which facilitates an efficient, low-complexity implementation in hardware. Further, in some embodiments, the filters used to generate the sub-band images of the DWT decomposition are designed from the values in a row of Pascal's triangle. Such filters, which have a simple filter structure and a flat frequency response, have been found by the inventors to be well-suited for extraction of low-frequency components associated with the unoccupied areas of the road in the original image.

Furthermore, not all sub-bands of the multi-level DWT decomposition process need to be computed at each level of the DWT decomposition. Instead, to determine the boundary of the unoccupied area of the road, one sub-band image from each level of the DWT decomposition needs to be computed, thereby greatly reducing the complexity of the search process.

FIG. 1 is a schematic illustration of an apparatus 1 for processing an image acquired by a vehicle-mounted camera, according to an embodiment. The apparatus 1 comprises a vehicle speed determination module 30 and may, as in the present embodiment, further comprise an unoccupied road area determination module 10 and a road marker determination module 20.

The (optional) unoccupied road area determination module 10 is arranged to process an image of a scene including a road, which has been captured by the vehicle-mounted camera, to generate boundary data that is indicative of a boundary of a region of the captured image which represents an unoccupied area of the road. The captured image may, as in the present embodiment, be a greyscale image. The image processing techniques described in the following may, however, be used to process one or more colour components of a colour image.

The unoccupied road area determination module 10 comprises a discrete wavelet transform (DWT) decomposition module 12 arranged to generate an LL sub-band image of an $N^{th}$ level of an (N+1)-level DWT decomposition of the captured image, by performing an iterative process of iteratively low-pass filtering and down-sampling the image N times, where N is an integer equal to or greater than one. In other words, the DWT decomposition module 12 is arranged to generate the LL sub-band image of the Nth level of the (N+1)-level DWT decomposition of the image by low-pass filtering and down-sampling the image in a first iteration, applying the same low-pass filtering and down-sampling to a result of the first iteration to generate a result of a second iteration, applying the same low-pass filtering and down-sampling to a result of the second iteration to generate a result of a third iteration, etc.

The DWT decomposition module 12 is further arranged to generate a sub-band image of an $(N+1)^{th}$ level of the (N+1)-level DWT decomposition of the image by high-pass filtering the LL sub-band image of the $N^{th}$ level, and down-sampling a result of the high-pass filtering, such that the sub-band image of the $(N+1)^{th}$ level has at least one region of pixels having substantially equal pixel values, which represents at least one unoccupied area of the road in the image acquired by the vehicle-mounted camera, with a remaining part of the sub-band image of the $(N+1)^{th}$ level representing a remainder of the scene in the image acquired by the vehicle-mounted camera. The pixels in the at least one region of pixels may have pixels that are 'substantially equal' to each other in the sense of those pixel values having a smaller spread of pixel values (as quantified by their range, variance or standard deviation, for example) than a (identically defined) spread of pixel values among the pixels forming the remaining part of the sub-band image of the $(N+1)^{th}$ level, which represents the remainder of the scene in the image acquired by the vehicle-mounted camera.

The unoccupied road area determination module 10 further comprises a boundary data generator module 14, which is arranged to generate the boundary data by determining a boundary of the region of pixels that have substantially equal pixel values.

Figure 2:
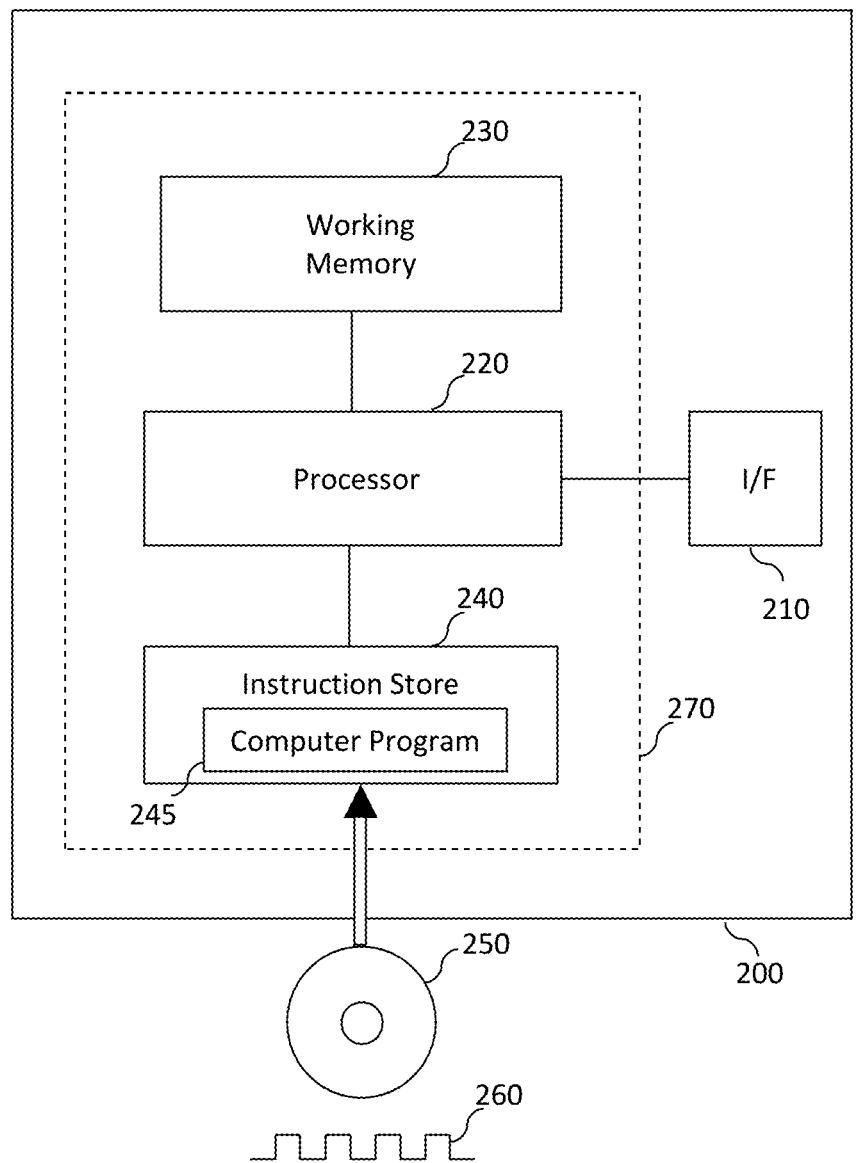
FIG. 2 is a block diagram illustrating an example implementation of the apparatus of the embodiment in programmable signal processing hardware.

FIG. 2 is a schematic illustration of programmable signal processing apparatus 200, which may be configured to implement the functionality of the apparatus 1. The signal processing apparatus 200 comprises an interface module 210 for receiving image data defining the digital image(s) captured by the vehicle-mounted camera. The signal processing apparatus 200 further comprises a processor (CPU) 220 for controlling the apparatus 1, a working memory 230 (e.g. a random-access memory) and an instruction store 240 storing a computer program comprising computer-readable instructions which, when executed by the processor 220, cause the processor 220 to perform the processing operations of the apparatus 1. The instruction store 240 may comprise a ROM (e.g. in the form of an electrically-erasable programmable read-only memory (EEPROM) or flash memory) which is pre-loaded with the computer-readable instructions. Alternatively, the instruction store 240 may comprise a RAM or similar type of memory, and the computer-readable instructions can be input thereto from a computer program product, such as a computer-readable storage medium 250 such as a CD-ROM, etc. or a computer-readable signal 260 carrying the computer-readable instructions.

In the present example embodiment, the combination 270 of the hardware components shown in FIG. 2, comprising the processor 220, the working memory 230 and the instruction store 240, is configured to implement the functionality of apparatus 1 and each of the its component modules shown in FIG. 1.

Figure 3:
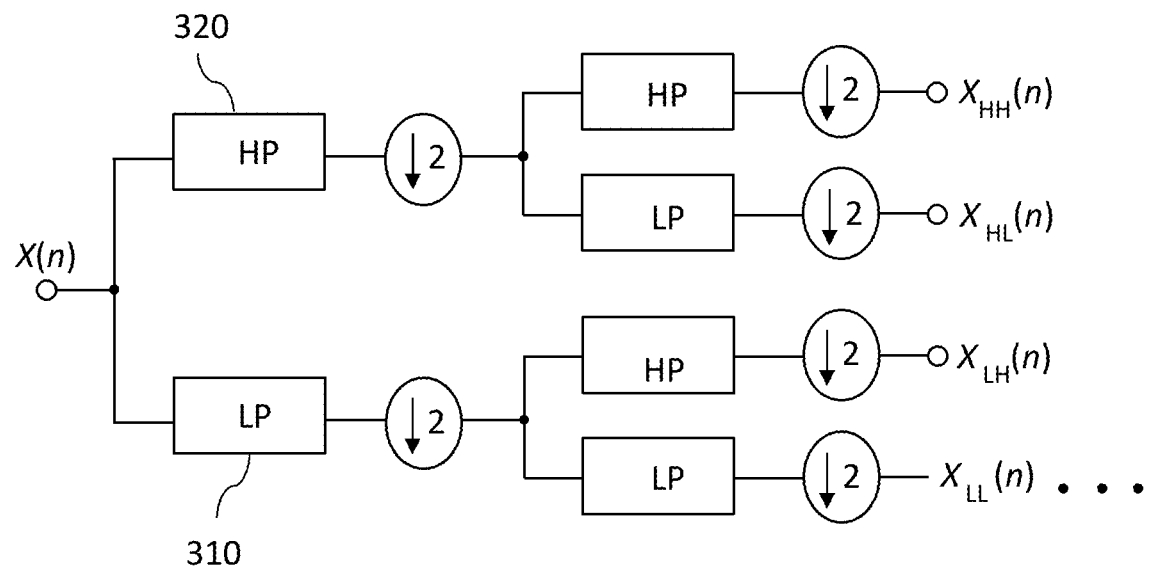
FIG. 3 is a schematic illustration of a sequence of filtering and down-sampling operations that are performed in a single-level DWT decomposition of a two-dimensional image to generate four sub-band images.

FIG. 3 illustrates a sequence of filtering and down-sampling operations that are performed for a single level of a DWT decomposition of a two-dimensional image. In FIG. 3, the input image X(n) is decomposed into four sub-band images, namely an LL sub-band image $X_{LL}(n)$, an LH sub-band image $X_{LH}(n)$, an HL sub-band image $X_{HL}(n)$, and an HH-sub-band image $X_{HH}(n)$, using the filter bank structure illustrated in FIG. 3. The subscripts LL, LH, HL and HH indicate the type of filters that are used to generate the respective sub-band images. For example, as shown in FIG. 3, the LL sub-band image $X_{LL}(n)$ is generated by applying a low-pass filter 310 across the rows of the input image X(n), down-sampling the columns of the resulting intermediate image by a factor of two, applying the low-pass filter 310 across the columns of the down-sampled image, and down-sampling the rows of the resulting image by a factor of two. The LH sub-band image is generated in a similar manner and differs from the generation of the LL sub-band only in that a high-pass filter 320 is applied across the columns of the down-sampled image instead of the low-pass filter 310.

The low-pass filter 310 and the high-pass filter 320 in the DWT decomposition form a quadrature mirror filter bank pair, such that the magnitude response of the high-pass filter 320 is derived from the magnitude response of the low-pass filter 310 by mirroring the magnitude response of the low-pass filter 310 around the value $\pi/2$ in the frequency domain. For a multi-level DWT decomposition process, the sequence of filtering and down-sampling steps, which are illustrated in FIG. 3, are performed iteratively for all levels of the DWT decomposition. That is, for a first level of a multi-level DWT decomposition process, the input image X(n) is decomposed into LL, LH, HL and HH sub-band images of the first level. For the $n^{th}$ level of the multi-level DWT decomposition process, the sequence of the filtering and down-sampling operations illustrated in FIG. 3 is performed on the LL sub-band image generated at the $(n-1)^{th}$ level of the DWT decomposition, in order to obtain the LL, LH, HL and HH sub-band images of the $n^{th}$ level.

Figure 4:
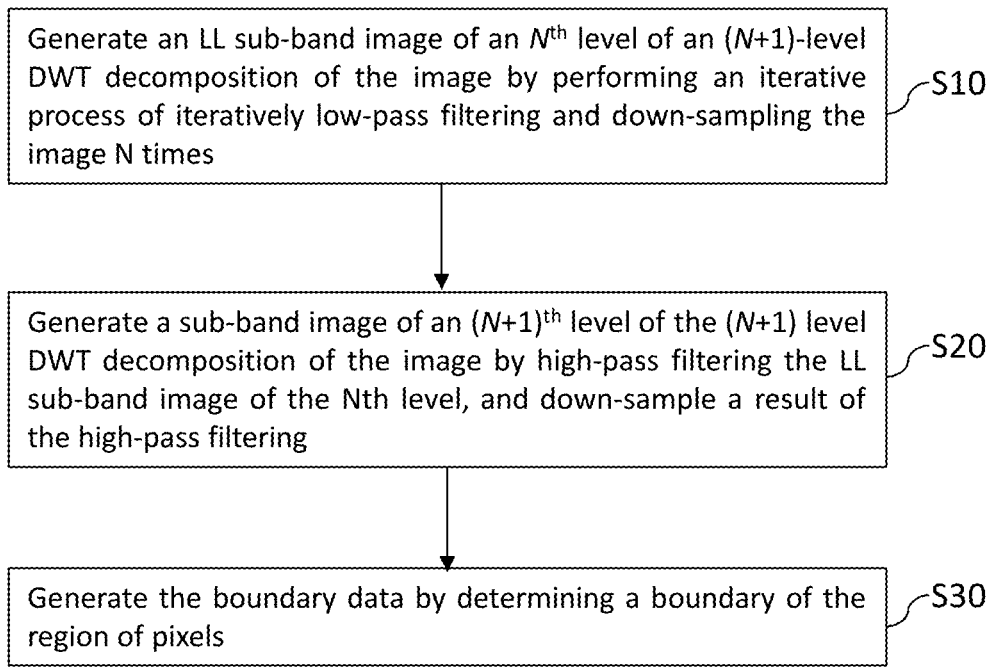
FIG. 4 is a flow diagram illustrating a method by which the unoccupied road area determination module of the apparatus of FIG. 1 processes an image to generate boundary data.

FIG. 4 is a flow diagram illustrating a method of processing an image of a scene including a road that has been acquired by the vehicle-mounted camera, which is performed by the unoccupied road area determination module 10 of FIG. 1. The image is processed to generate boundary data that is indicative of a boundary of a region of the image which represents an unoccupied area of the road.

The vehicle-mounted camera may, as in the present embodiment, be a forward-looking camera mounted on a car, van, lorry or other road vehicle, and the acquired image may contain an unoccupied area of the road ahead of the vehicle. It should be noted that the image may alternatively be a rear-view image of the road that has been acquired by a rear-view camera mounted on the vehicle, or a side-view image acquired by a side-view camera mounted on a left- or right-hand side of the vehicle.

The unoccupied road area determination module 10 may, as in the present embodiment, process the image of the scene as acquired by the vehicle-mounted camera, i.e. with no pre-processing of the image as acquired by the vehicle-mounted camera being performed before the image is input to the unoccupied road area determination module 10 for processing.

In step S10 of FIG. 4, the DWT decomposition module 12 generates an LL sub-band image of an Nth level of an (N+1)-level DWT decomposition of the acquired image by performing an iterative process of iteratively low-pass filtering and down-sampling the image N times, where N is an integer equal to or greater than one. That is, an LL sub-band image of a first level of the (N+1)-level DWT decomposition is generated by low-pass filtering and down-sampling the image. Furthermore, for a value of N equal to or greater than two, an LL sub-band image of an $L^{th}$ level of the DWT decomposition is generated by low-pass filtering an LL sub-band image of the $(L-1)^{th}$ level, wherein L is an integer greater than 1 and less than or equal to N.

The DWT decomposition module 12 may, as in the present embodiment, use a low-pass filter 310 having a first sequence of filter coefficients that are symmetrical in at least one iteration of the iterative process of iteratively low-pass filtering and down-sampling that is performed in step S10. In addition, the filter coefficients in the sequence of filter coefficients of the low-pass filter 310 may, as in the present embodiment, have integer values. Furthermore, the filter coefficients in the sequence may, as in the present example, be set to the values in a row of Pascal's triangle having the same number of values as the order of the low-pass filter 310. However, the sequence of filter coefficients of the low-pass filter 310 need not be selected based on the rows of Pascal's triangle, and may alternatively take the form of other integer values that are symmetric.

In the present embodiment, each iteration of the iterative low-pass filter and down-sampling may be performed using the sequence of low-pass filtering and down-sampling steps illustrated in FIG. 3 for generating the LL sub-band. That is, each iteration of the iterative low-pass filtering and down-sampling process performed in step S10 may comprise applying a $1\times L_1$ row kernel corresponding to the low-pass filter 310 across the rows of the LL sub-band image of the previous level of the DWT decomposition (herein also referred to as the 'DWT level') (or across the rows of the acquired image if the iteration corresponds to a first level of DWT decomposition), down-sampling the columns of the low-pass filtered image by a factor of two, further applying a $L_2\times 1$ column kernel corresponding to low-pass filter 310 across the columns of the down-sampled image, and then down-sampling the further filtered image over its rows by a factor of two.

In the present embodiment, the same low-pass filter 310 is used to filter both the rows and the columns of the input image at each of the first N levels of the (N+1)-level DWT decomposition in order to generate the LL sub-band image for each of the first N levels. However, it should be noted that the generation of the LL sub-band image of the $N^{th}$ level of the DWT decomposition is not limited in this regard. In particular, at each level of the DWT decomposition in which an LL sub-band image is computed, $L_1$ is not required to be equal to $L_2$, and different low-pass filters may be used to filter the rows and the columns. In addition, different low-pass filters having different filter coefficients and/or different filter orders may alternatively be used for different levels of the DWT decomposition.

In an alternative embodiment, each iteration of the iterative low-pass filtering and down-sampling in step S10 may instead comprise applying a $L_2\times 1$ column kernel corresponding to the low-pass filter 310 across the columns of the LL sub-band image of the previous level of the DWT decomposition (or across the columns of the input image if the iteration corresponds to a first level of DWT decomposition), down-sampling the low-pass filtered image over its rows by a factor of two, applying a $1\times L_1$ row kernel corresponding to the low-pass filter 310 across the rows of the down-sampled image, and down-sampling the columns of the further filtered image by a factor of two.

Furthermore, in some embodiments, each iteration of the iterative low-pass filtering and down-sampling performed in step S10 of FIG. 4 comprises generating a low-pass filtered sub-band image by applying a two-dimensional kernel across the LL sub-band image of the previous level of the DWT decomposition (or across the acquired (input) image if the iteration corresponds to first level of DWT decomposition). The two-dimensional kernel is separable into a product of two one-dimensional kernels, namely a row kernel and a column kernel. The row kernel and the column kernel are each defined by a low-pass filter 320. The low-pass filtered image may then be down-sampled by a factor of two along both its rows and columns.

In step S20 of FIG. 4, the DWT decomposition module 12 generates a sub-band image of an $(N+1)^{th}$ level of the (N+1)-level DWT decomposition of the input image by high-pass filtering the LL sub-band image of the $N^{th}$ level, and then down-sampling a result of the high-pass filtering such that the sub-band image of the $(N+1)^{th}$ level has a region of pixels having substantially equal pixel values, which represents the unoccupied area of the road in the image acquired by the vehicle-mounted camera.

Pixels neighbouring the region in the sub-band image of the $(N+1)^{th}$ level may have pixel values that are substantially different from the pixel values of the pixels inside the region. The region may, as in the present embodiment, be a substantially dark region defined by pixels having low pixel values, as the high-pass filtering of the LL sub-band image of the $N^{th}$ level removes low spatial frequency components of the image that represent the largely homogenous surface of the road. Accordingly, the region in the sub-band image of the (N+1)-level may, as in the present embodiment, have pixels with pixel values that are substantially lower than those of pixels outside the region that neighbour (i.e. that are adjacent to) the region. In addition, the region may have an average pixel value that is substantially lower than an average pixel value of pixels outside the region that neighbour the region.

The high-pass filtering used to generate the sub-band image of the $(N+1)^{th}$ level in step S20 of FIG. 4 may, as in the present embodiment, comprise applying a high-pass filter 320 having a sequence of filter coefficients that are symmetrical. In addition, the filter coefficients in the sequence may, as in the present embodiment, also be integer-valued. Furthermore, alternate filter coefficients in the sequence of filter coefficients of the high-pass filter 320 may, as in the present embodiment, be set to correspondingly located values in a row of Pascal's triangle having the same number of values as the order of the high-pass filter 320. Further, in the present embodiment, each remaining filter coefficient in the sequence of filter coefficients of the high-pass filter 320 is set to a value obtained by multiplying a correspondingly-located value in the row of Pascal's triangle by −1. It should be noted, however, that the filter coefficients of the low-pass filter 310 and the high-pass filter 320 used to generate the LH sub-band are not limited to those of the symmetrical, integer-valued filters as described above.

In the present example, N is taken to be 4, such that the LL sub-band of the $4^{th}$ level of a 5-level DWT decomposition of the image is generated by the DWT decomposition module in step S10 of FIG. 4. However, the value of N is not limited in this regard. In some embodiments, the DWT decomposition module 12 is arranged to set the value of N to a value that is based on an image resolution of the image captured by the vehicle-mounted camera, for example by using a predetermined mapping between values of the image resolution and values of N. In other embodiments, particularly in cases where the resolution of the images captured by the vehicle-mounted camera is known and not expected to change, the value of N may be predetermined and may, for example, be set to a value of four or greater. The iterative low-pass filtering and down-sampling across (N+1)-levels of DWT decomposition performed at step S10 of FIG. 4 achieves the effect of smoothing the image and extracting increasingly narrow bandwidth of low spatial frequency components with each iteration. As the number of iterations of the iterative low-pass filtering increases (corresponding to increasing levels of the DWT decomposition), the signal components corresponding to the unoccupied area of the road are extracted, as these signal components typically form the lowest frequency components in the image of the scene acquired by the camera, owing to the generally homogeneous appearance of much of the road surface.

Furthermore, in the present embodiment, the sub-band image of the $(N+1)^{th}$ level of the DWT decomposition generated in step S20 of FIG. 4 is an LH sub-band of a 5th level of the 5-level DWT decomposition (herein also referred to as the '5th level'). It should be noted, however, that the sub-band image of the $(N+1)^{th}$ level need not be the LH sub-band image, and may alternatively be the HL sub-band image or the HH sub-band image of the $(N+1)^{th}$ level of the DWT decomposition. Generating the LH sub-band image of the 5th level may, as in the present embodiment, comprise applying the $1 \times L_1$ row kernel corresponding to the low-pass filter 310 across the rows of LL sub-band image of 4th level, down-sampling the columns of the low-pass filtered image by a factor of two, further applying a $L_2 \times 1$ column kernel corresponding to the low-pass filter 320 across the columns of the down-sampled image, and then down-sampling the further filtered image over its rows by a factor of two to generate the LH sub-band image of the $5^{th}$ level.

In addition, the LH sub-band of the $5^{th}$ level may, as in the present embodiment, be generated using a low-pass filter 310 and a high pass-filter 320 that form a quadrature mirror pair. In the present embodiment, the low-pass filter 310 and the high-pass filter 320 used to generate the LH sub-band image of the $5^{th}$ level are filters of the same order, such that $L_1 = L_2$. However, it should be noted that the low-pass filter 310 need not be of the same order as the high-pass filter 320, and that the dimensions of the kernels corresponding to each filter may instead be selected based on the characteristic properties of the features of the image that are being sought.

In some embodiments, generating the LH sub-band image of the 5th level may alternatively comprise applying a $L_2 \times 1$ column kernel corresponding to the high-pass filter 310 across the columns of the LL sub-band image of the 4th level, down-sampling the low-pass filtered image over its rows by a factor of two, applying a $1 \times L_1$ row kernel corresponding to the low-pass filter 310 across the rows of the down-sampled image, and down-sampling the columns of the further filtered image by a factor of two to generate the LH sub-band image of the $5^{th}$ level of the DWT decomposition.

Furthermore, in some embodiments, generating the LH sub-band of the $5^{th}$ level may alternatively be performed by first generating a filtered sub-band image applying a two-dimensional kernel across the LL sub-band image of the 4th level. The two-dimensional kernel is separable into a product of two one dimensional kernels, namely, a row kernel and a column kernel. The row kernel corresponds to the low-pass filter 310 and the column kernel corresponds to the high-pass filter 320. The low-pass filtered image may then be down-sampled by a factor of two along both its rows and columns by a factor of two to generate the LH sub-band image of the 5th level.

Each of the low-pass filter 310 and the high-pass filter 320 may, as in the present embodiment, have symmetrical, integer-valued filter coefficients which are set in accordance with the values in a row of Pascal's triangle. More specifically, in the present embodiment, the low-pass filter 310 that is used to generate the LH sub-band image of the $5^{th}$ level of the DWT decomposition has filter coefficients of [1, 6, 15, 20, 15 6, 1], while the complementary high-pass filter, which forms a quadrature mirror pair with the low-pass filter, has filter coefficients that are obtained by multiplying every second coefficient of the low-pass filter by −1, such that the high-pass filter has filter coefficients [1, −6, 15, −20, 15 −6, 1]. Furthermore, in the present example, each of the high pass filter 320 and the low-pass filter 310 may additionally be normalized by a factor of $1/64$ (or $1/2^F$ in the general case where an F-order filter is used). However, to reduce computational complexity, the filtering operations (i.e. the convolution of filter input with the filter kernels) may be performed using the integer-valued coefficients of the low-pass filter 310 and the high-pass filter 320, while the normalization factor associated with each filter may be applied separately, after the filtering operation.

A number of significant advantages can be achieved by using the symmetrical, integer-valued filters as described above. Firstly, filters having integer coefficients facilitate low-complexity implementation of the image processing algorithm described herein in software and/or hardware (FPGA or ASIC) systems. In particular, small integer-valued coefficients facilitate efficient implementation of the filtering process in fixed-point arithmetic, where multiplication operations may be realized with very small numbers of summing operations, while division can be implemented by shifting of the bits. Furthermore, by using a sequence of filter coefficients that are symmetrical, the high-pass filter of a complementary quadrature mirror pair can be designed from the sequence of filter coefficients of the low-pass filter by multiplying every second coefficient in the sequence by −1.

The inventors have found that the use of symmetric filters whose coefficients are set in accordance with values in a row of Pascal's triangle may allow the unoccupied road area in the acquired image to be determined more accurately. In particular, low-pass filters having such filter coefficients have a substantially flat frequency response, with cut-off frequencies that decrease towards zero as the filter order increases. As the signal components of interest in the image are low-frequency components that correspond to unoccupied area(s) of the road, symmetrical filters whose filter coefficients are set in accordance with the values in a row of Pascal's triangle may allow more effective filtering of unwanted high-frequency noise components in the image, and more effective extraction of the low-frequency components in the image that correspond to unoccupied road area(s). As such, symmetric filters designed based on the values of a row of Pascal's triangle may allow more effective detection of the unoccupied road area than orthogonal filters that are based on orthogonal wavelets, such as the Daubechies wavelet, for example.

FIG. 5 illustrates low-pass filter coefficients 510 for low-pass filters of different orders, which are based on the values in a row of Pascal's triangle. FIG. 5 also illustrates high-pass filter coefficients 520 for high-pass filters of different orders, which are also based on the values of a row of Pascal's triangle. In FIG. 5, the integer-valued high-pass and low-pass filters are normalized by a factor of $\frac{1}{2}^F$. However, the filters illustrated in FIG. 5 may be considered integer filters, as the filtering step may be performed using filters that are defined entirely by integer-valued coefficients, while the normalization factor may be applied as a separate step before or after the filtering operation, for example.

Figure 6:
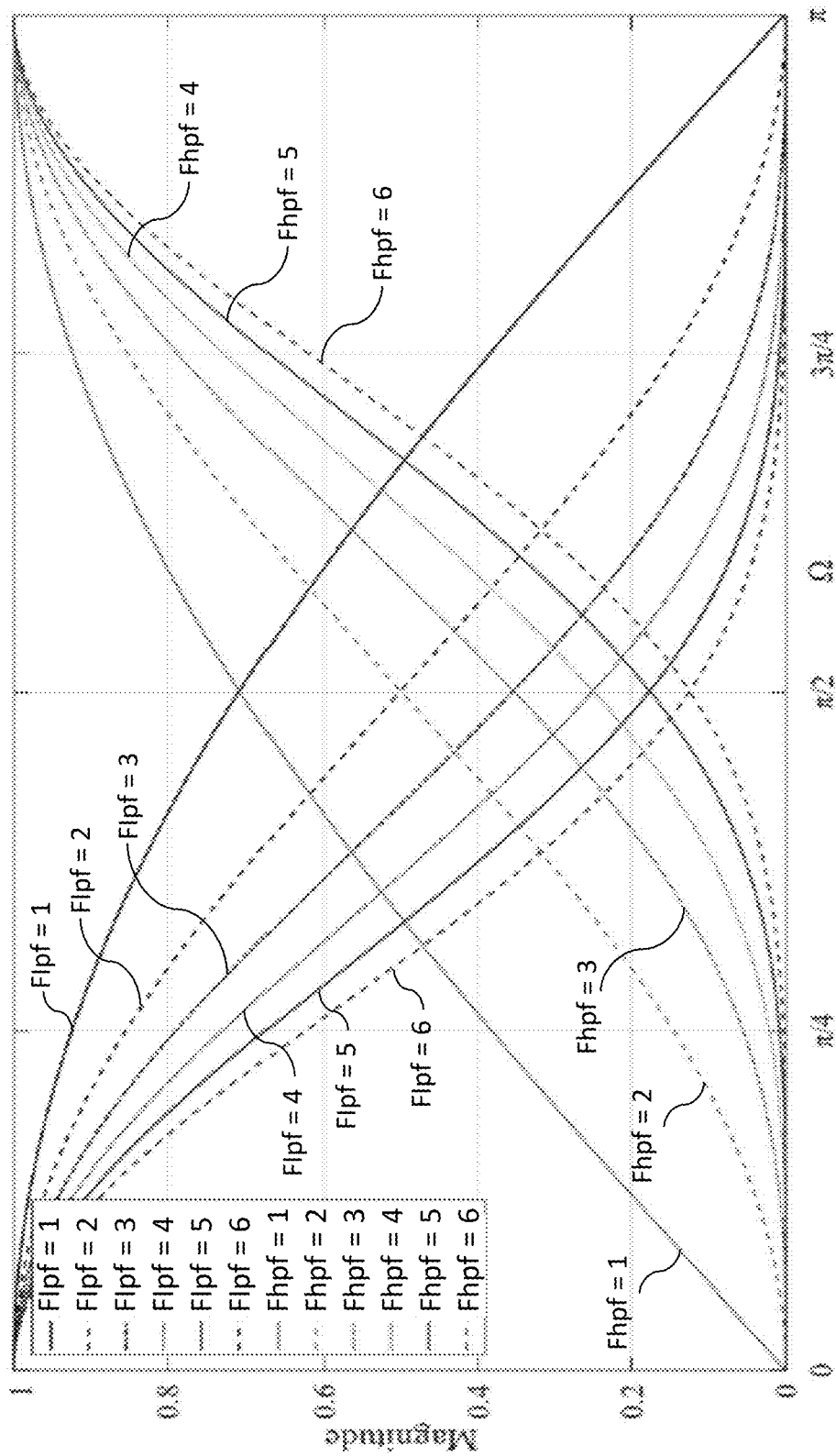
FIG. 6 illustrates frequency responses of the low-pass filters and the complementary high-pass filters of FIG. 5 for different filter orders.

FIG. 6 illustrates, for different filter orders, the frequency response of the low-pass filters and the complementary high-pass filters that are designed using a row of Pascal's triangle, as shown in FIG. 5. FIG. 6 illustrates that, as the filter order increases, the cut-off frequency of the low-pass filters decreases towards zero frequency, while the lower cut-off frequency of the high-pass filters approaches the Nyquist frequency. This provides a desired property of allowing the low-frequency components in the image to be more effectively extracted.

It should be noted that, although four sub-bands are illustrated for a single level of the DWT decomposition process in FIG. 3, the present method of determining a boundary indicative of the boundary of the unoccupied road area only requires the generation of the LL sub-band for the first N-levels of the (N+1)-level DWT decomposition, and the generation of one of an LH sub-band image, an HL sub-band image and an HH sub-band image for the $(N+1)^{th}$ level of the DWT decomposition. The remaining sub-band images of each level do not need to be generated.

Referring again to FIG. 4, in step S30, the boundary data generator module 16 generates the boundary data by determining a boundary of the region of pixels in the sub-band image of the $(N+1)^{th}$ level (which is the LH sub-band of the $5^{th}$ level in the present example) that represent the unoccupied area of the road in the acquired image. The region may, as in the present embodiment, comprise pixels with pixel values that are substantially lower than those of the neighbouring pixels of the region. For example, the region may have an average pixel value that is substantially less than the average pixel value of neighbouring pixels of the region. Furthermore, a spread of the pixel values of pixels in the region (as measured by the range, variance or standard deviation of the pixel values, for example) may be substantially less than the spread (as identically defined) of the pixel values of the pixels neighbouring the region.

Figure 7A:
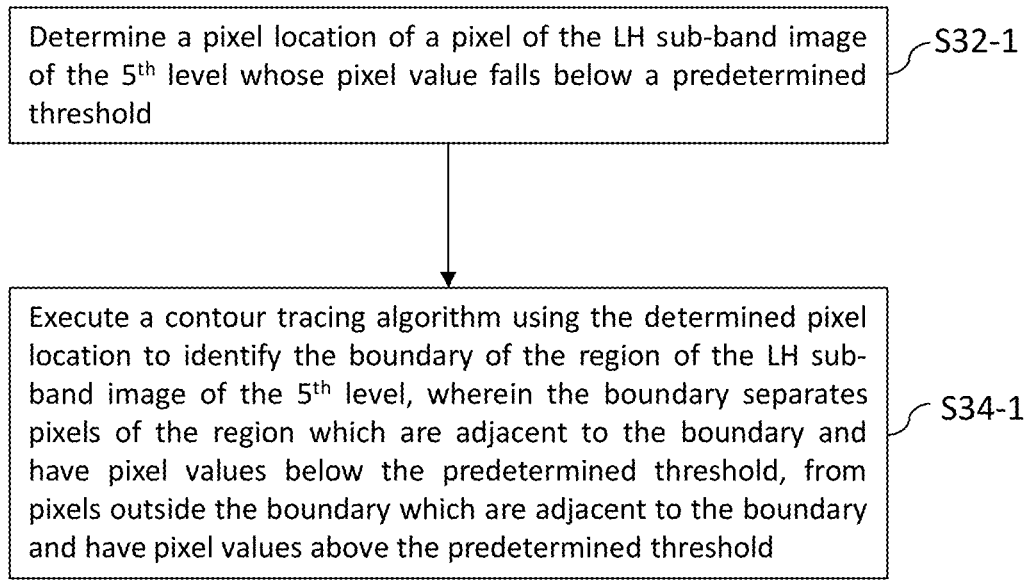
FIG. 7A illustrates a method which can be performed by a boundary data generator module of the unoccupied road area determination module to identify a boundary of a region in a sub-band image that is indicative of a boundary of an unoccupied road area in the image acquired by the vehicle-mounted camera.

FIG. 7A illustrates a method which can be performed by the boundary data generator module 14 in step S30 of FIG. 4 to identify the boundary of the region in the LH sub-band image of the $5^{th}$ level that is representative of the unoccupied road area in the acquired image.

In step S32-1 of FIG. 7A, the boundary data generator module 14 first determines a pixel location of a pixel of the LH sub-band image of the $5^{th}$ level, whose pixel value falls below a predetermined pixel threshold. The determination of this pixel location may be done iteratively, by checking each pixel of the LH sub-band image until a pixel whose pixel value is below the predetermined pixel threshold is found. The search for the pixel location may, for example, begin from the bottom boundary of the LH sub-band image, as the region of the LH sub-band image that represents the unoccupied area of the road may in practice often extend from the bottom boundary of the LH sub-band (as the camera is often mounted on the vehicle so that a lower portion of its field-of-view does not include a part of the vehicle, such as the bonnet or roof). However, the search is not limited in this regard.

In step S34-1 of FIG. 7A, once the pixel location has been determined, the boundary data generator module 14 executes a contour tracing algorithm using the determined pixel location to identify the boundary of the region. The boundary separates pixels of the region, which are adjacent to the boundary and have pixel values below the predetermined threshold, from pixels outside the boundary which are adjacent to the boundary and have pixel values above the predetermined threshold. Any suitable boundary/contour tracing algorithm may be used in step S34-1, such as the Moore-neighbour-tracing algorithm, the radial sweep algorithm, or the square tracing algorithm, for example. It should be noted, however, that the boundary need not be determined by use of a contour tracing algorithm in step S30 of FIG. 4, and may be found in any other way.

Figure 7B:
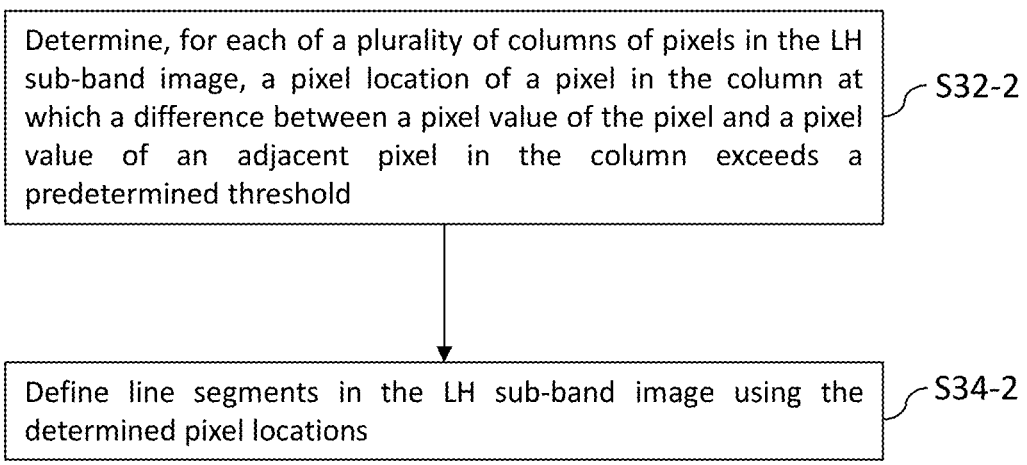
FIG. 7B illustrates an alternative method can be performed by the boundary data generator module to identify a boundary of a region in a sub-band image that is indicative of a boundary of an unoccupied road area in the image acquired by the vehicle-mounted camera.

For example, FIG. 7B illustrates an alternative method which can be performed by the boundary data generator module 14 in step S30 of FIG. 4 to determine the boundary of the aforementioned region in the LH sub-band image of the $5^{th}$ level.

In step S32-2 of FIG. 7B, the boundary data generator module 14 determines, for each of a plurality of columns of pixels in the LH sub-band image of the $5^{th}$ level, a pixel location of a pixel in the column at which a difference between a pixel value of the pixel, and a pixel value of an adjacent pixel in the column, exceeds a predetermined threshold.

In step S34-2 of FIG. 7B, the boundary data generator module 14 further defines line segments in the LH sub-band image of the $5^{th}$ level using the determined pixel locations. The line segments define the boundary of the aforementioned region in the LH sub-band image. The pixel location (at which the difference between the pixel value of the pixel and the pixel value of the adjacent pixel in the column exceeds a predetermined threshold) may, for example, be determined for each of the plurality of columns of pixels in the LH sub-band image by evaluating the difference for successive pixels in the column, starting from a pixel at a bottom of the column, for example. Furthermore, each of the line segments may be defined to connect a pixel at the determined pixel location in a respective column of the plurality of columns of pixels to a pixel at the determined pixel location in an adjacent column of the plurality of columns of pixels.

Figure 8A:
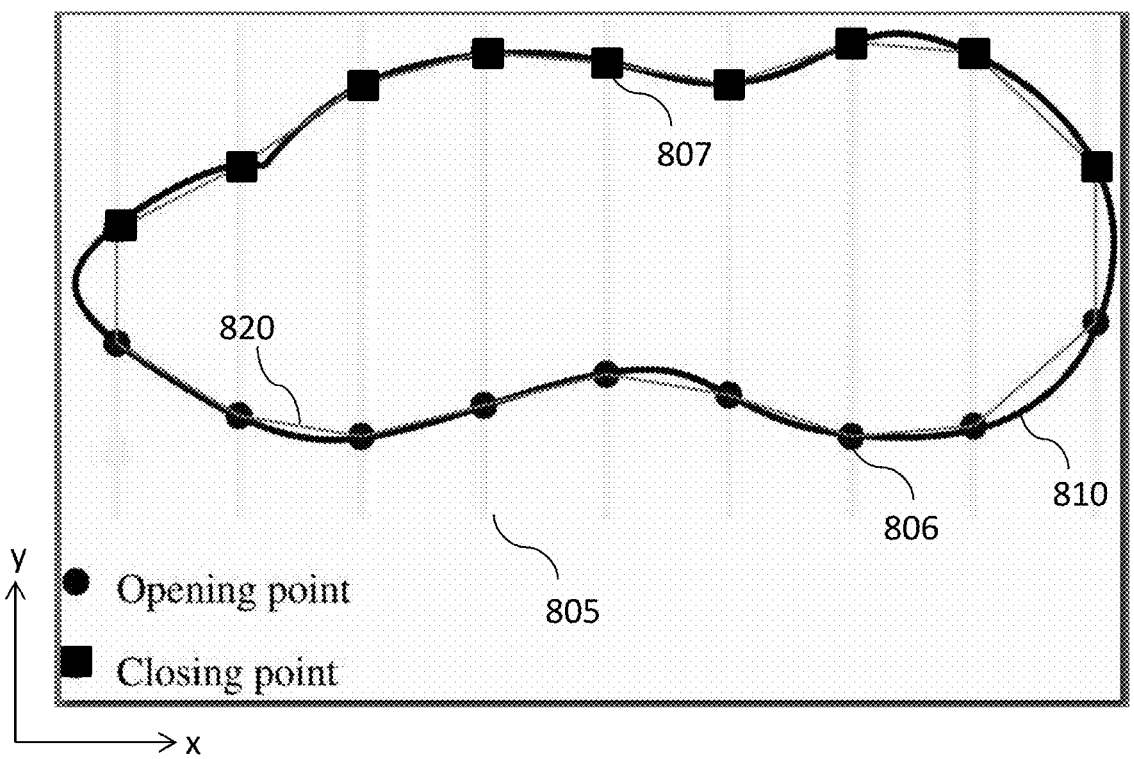
FIG. 8A illustrates the generation of a boundary of a region in a sub-band image that is indicative of a boundary of an unoccupied road area in the image acquired by the vehicle-mounted camera, in an example implementation of the method of FIG. 7B.

FIG. 8A illustrates an example implementation of the method of FIG. 7B. In FIG. 8A, a plurality of pixel columns 805 extend across an image, in which a boundary around a dark region 810 in the image is to be determined. Although not shown in FIG. 8A for clarity, it is assumed that the region of the image within the boundary 810 is significantly darker than the part of the image outside the boundary 810. In FIG. 8A, for each column 805 that is selected for analysis, the change in pixel value between each pixel in the column 805 and an adjacent pixel in the same column 805 is evaluated. For each column 805, an opening point 806 (marked by a black dot in FIG. 8A) is designated at a pixel location where a change in pixel value between adjacent pixels exceeds a negative threshold (namely, a point of transition from a 'bright' pixel to a 'dark' pixel). Upon determining an opening point 806 in each column 805, the comparison of pixel values of adjacent pixels in the column is continued from the opening point 806 along the column, and a closing point (illustrated as a black square in FIG. 8A) is designated at the next pixel location where a change in pixel value between adjacent pixels exceeds a positive threshold (namely, a point of transition from a 'dark' pixel to a 'bright' pixel). Upon determining an opening point 806 and closing point 807 for each column 805, opening points 806 in adjacent columns are connected using a polyline 820, and closing points 807 in adjacent columns are connected using a polyline 830. Furthermore, for columns of the plurality of columns 805 that are closest to the left- and right-hand boundaries of the LH sub-band image, the opening point 806 and closing point 807 may also be joined by a line segment. In this manner, as shown in FIG. 8A, a closed contour defined by polyline segments is generated. The closed contour defines the boundary of the region of the LH sub-band image of the $5^{th}$ level that represents the unoccupied road area in the original image of the scene.

Figure 8B:
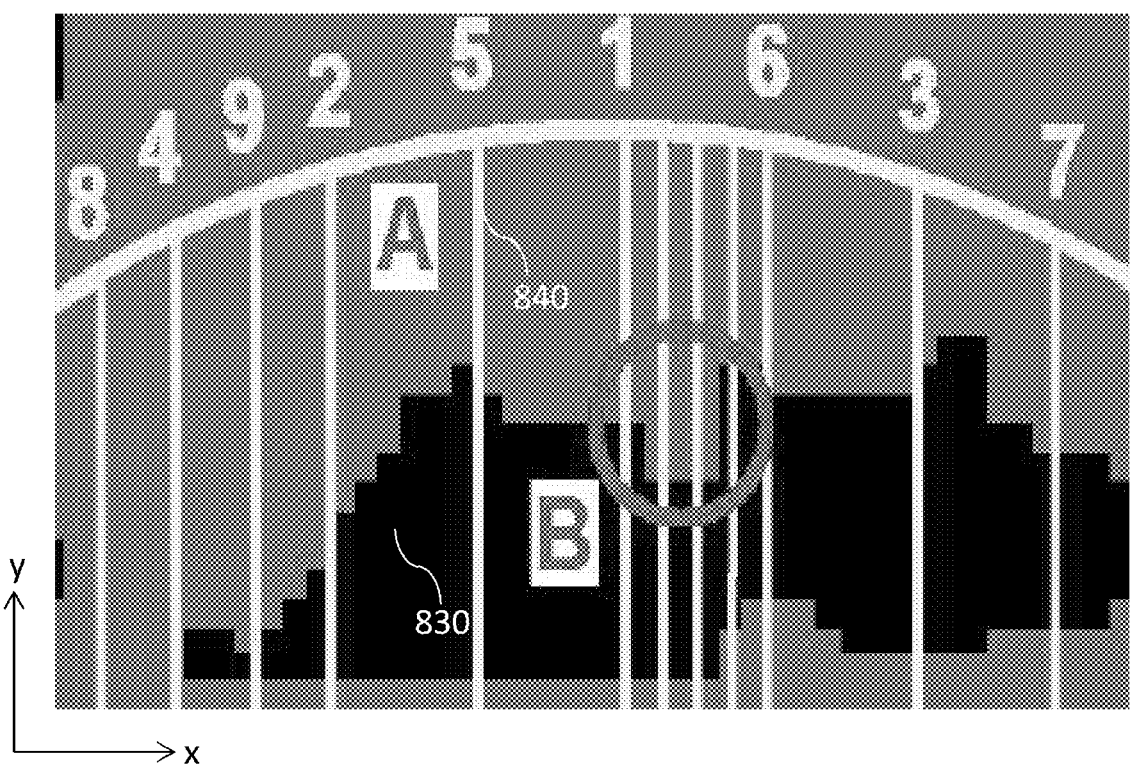
FIG. 8B illustrates the generation of a boundary of a region in a sub-band image that is indicative of a boundary of an unoccupied road area in the image acquired by the vehicle-mounted camera, in another example implementation of the method of FIG. 7B.

In some embodiments, the pixel columns 805 in step S32-2 of FIG. 7B may be selected in a sequential manner as shown in FIG. 8B. In FIG. 8B, the method of FIG. 7B is applied to an LH sub-band image in which a boundary is to be determined around a dark region 830 in the LH sub-band image that represents the unoccupied road area in the image of the scene. In FIG. 8B, a plurality of columns 840 of the LH sub-band image is sequentially selected and analysed. The order in which the columns 840 are analysed is based on the numbering which appears above each column. As shown in FIG. 8B, the first column of pixels selected for analysis may be a pixel column in a central area of the LH sub-band image, such that the pixel column splits the LH sub-band image into two halves. Then, two further pixel columns are selected at horizontal coordinates of the LH sub-band image such that each of the two halves are split into two new substantially equal regions. The process is then repeated. For example, for an image of size 255×255 pixels, pixel columns at the following x-coordinate position may be selected at each step of the analysis process:

$1^{st}$ step: 128
$2^{nd}$ step: 64, 192
$3^{rd}$ step: 32, 96, 160, 224
$4^{th}$ step: 16, 48, 80, 112, 144, 176, 208, 240

In FIG. 8B, the sequence in which pixel columns 840 are analysed is illustrated by the numbering above the illustrated pixel columns 840. It should be noted that the sequence in which the pixel columns 840 are selected is by no means limited to the present example. Furthermore, in some embodiments, when a substantial difference is found between the y-values (i.e. y-axis coordinate values) of opening points (or closing points) in adjacent columns 840 that are selected for analysis, additional columns 840 can be selected for analysis between the two adjacent columns 840 in order to allow more detailed boundaries to be determined.

In some embodiments, the image of the scene may be a 360-degree field-of-view image of the road around the vehicle. Such an image can be constructed by combining images of the road that have been acquired from front-facing, side-facing and rear-facing cameras mounted on the vehicle. In such embodiments, the boundary of the region representative of the unoccupied area of the road can be determined from a sub-band image of the 360-degree image of the road by analysing the change in pixel value between adjacent pixels for each of a plurality of selected lines of pixels that extend from a centre of the sub-band image to an edge of the sub-band image. For example, if the pixels of the sub-band image are identified by the coordinates of a polar coordinate system, then each of the selected lines of pixels may extend from a central coordinate of the image, and each line of pixels may correspond to a different polar angle.

In some embodiments, where the image that is processed by the unoccupied road area determination module 10 further comprises a portion of the sky, the unoccupied road area determination module 10 may exclude from processing a portion of the image that represents the portion of the sky, in order to simplify the search for the unoccupied area of the road. In particular, the unoccupied road area determination module 10 may perform the processing described herein with reference to FIG. 4 only for the portion of the image below a horizon, which may be defined as a horizontal line running across the image whose placement in the image will depend on the inclination of the camera and can be set by inspection of images acquired by the camera.

Furthermore, in some embodiments, the boundary data generator module 14 may be arranged to apply a binary thresholding operation to the LH sub-band image of the $5^{th}$ level of the DWT decomposition (or the HL or HH sub-band image of the $5^{th}$ level, as the case may be) before determining the boundary of the region in the LH sub-band image (or the HL or HH sub-band image of the $5^{th}$ level, as the case may be) that is representative of the unoccupied road area. Applying a binary thresholding operation to the LH sub-band image may allow the dark regions corresponding the unoccupied road area to be more reliably determined from the LH sub-band image.

In some embodiments, non-linear pre-processing may be performed to normalise the $5^{th}$ level LH sub-band image before determining the boundary of the region representing the unoccupied road area. More specifically, the boundary data generator module 14 may be arranged to apply a scaling factor to the pixel value of each pixel of the LH sub-band image and saturate scaled pixel values that are above a pixel saturation threshold, before generating the boundary data (that is indicative of the boundary of the region of the image which represents the unoccupied area of the road). For example, the scaling factor may be multiplied with the pixel value of each pixel of the $5^{th}$ level LH sub-band image and the scaled pixel value may be converted into an 8-bit grey-scale value, such that scaled pixel values that are above 255 are saturated. The process of scaling followed by saturation has the effect of normalizing the LH sub-band image and improving its contrast, thus making the subsequent boundary determination process more robust to varying lighting conditions (i.e. varying contrast, brightness, and noise). In addition, the normalization can be achieved efficiently by simple multiplication operations, which is more computationally efficient than if non-linear filters were used to perform the normalization.

Once the boundary of the region in the LH sub-band image that corresponds to the unoccupied road area has been determined by the boundary data generator module 14, the determined boundary may be up-scaled and mapped to the input image or to a sub-band image of an earlier level (i.e. a lower-valued level) of the DWT decomposition, in order to facilitate extraction of other features or objects in the input image or the sub-band image, as will be described in more detail below.

Figure 9A:
FIG. 9A illustrates an example of an image of a scene including a road, which has been captured by the vehicle-mounted camera.
Figure 9B:
FIG. 9B illustrates an example of an LL sub-band image which has been generated from the image in FIG. 9A.
Figure 9C:
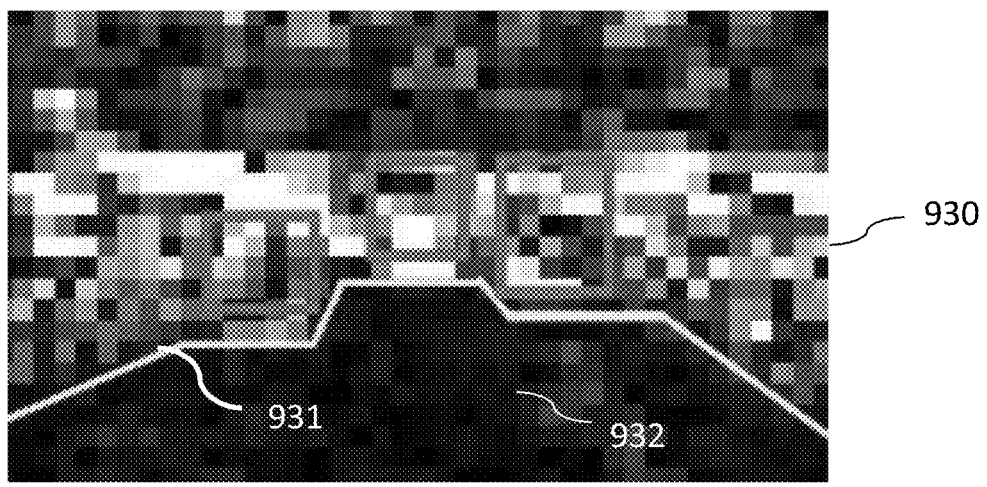
FIG. 9C illustrates an example of an LH sub-band image which has been generated from the image in FIG. 9A.

FIG. 9A is an example image of the road, and FIGS. 9B and 9C are sub-band images generated by processing the image in accordance with step S10 and step S20 of FIG. 4. More specifically, FIG. 9A is a greyscale image 910 of a scene comprising vehicles in front of the camera and an unoccupied area of the road between the vehicle carrying the camera and the other vehicles. FIG. 9B is the LL sub-band image 920 of a $4^{th}$ level DWT decomposition of input image 910 of FIG. 9A, which has been generated by the process of step S10 in FIG. 4, and using a low-pass filter having symmetric filter coefficients [1, 6, 15, 20, 15 6, 1] that are based on the values of a row of Pascal's triangle. As can be seen from FIG. 9B, the iterative low-pass filtering and down-sampling process generates a reduced resolution sub-band image, in which a high spatial frequency component corresponding from small-sized features in the input image are substantially removed, leaving only the low-frequency components. FIG. 9C is an LH sub-band image 930 of the $5^{th}$ level of the DWT decomposition of the input image 910 shown in FIG. 9A, which is generated by process S20 in FIG. 4. The LH sub-band image 930 shown in FIG. 9C is generated using the same low-pass filter as used to generate the $4^{th}$ level LL sub-band image 920 in the image shown in FIG. 9B, and by using a high-pass filter having filter coefficients [1, −6, 15, −20, 15 −6, 1]. The image shown in FIG. 9C also illustrates the boundary 931 of a dark region 932 of the LH sub-band image 930 of the $5^{th}$ level, which has been found using the boundary determination process performed in step S30 of FIG. 4. The dark region 932 represents the occupied road area in the image acquired by the vehicle-mounted camera. In addition, in the present example, the low-pass filter and the high-pass filter are each normalized by a factor of 1/64. The normalization may, as in the present example, be implemented as a separate operation from the filtering operation, as described in previous examples.

Figure 10A:
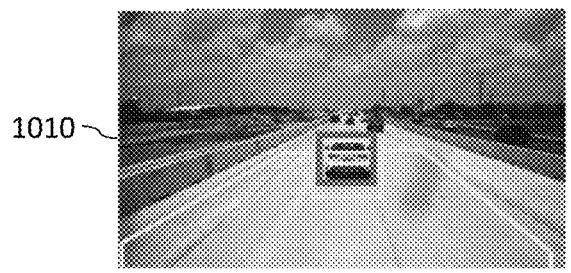
FIGS. 10A to 10C illustrate different images acquired by the vehicle-mounted camera.
Figure 10D:
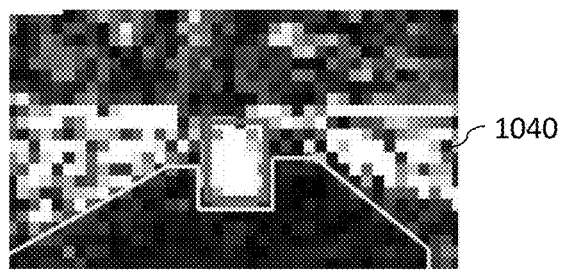
FIGS. 10D to 10F illustrate LH sub-band images derived from the images of FIGS. 10A to 10C, respectively, using the image processing method of FIG. 4.
Figure 10B:
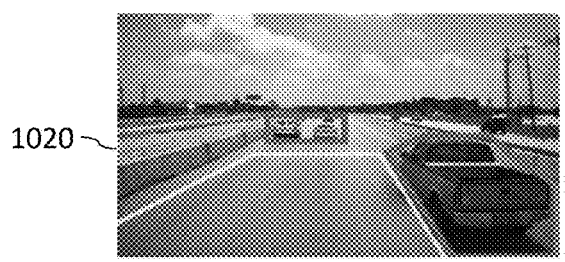
Figure 10E:
Figure 10C:
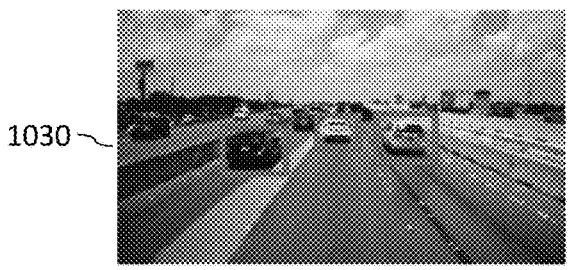
Figure 10F:
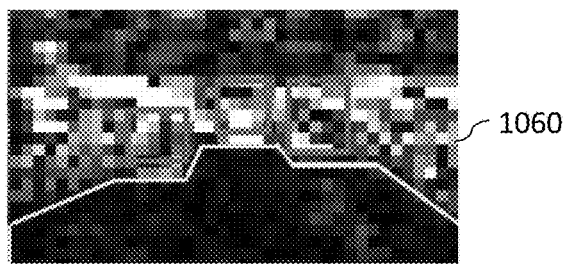

FIGS. 10A to 10C are images with different contrast, brightness, and uneven brightness of the road, and FIGS. 10D to 10F show results of applying the process described above with reference to FIG. 4 to images 10A to 10C, respectively. FIG. 10A is an image 1010 of a scene that has high contrast and low brightness, and FIG. 10D illustrates the LH sub-band image 1040 of the $5^{th}$ level DWT decomposition which has been generated from the image 1010 in FIG. 10A by performing step S20 of FIG. 4 and using the same filters as described above in connection with FIG. 9. FIG. 10B is an image 1020 of a scene that has high contrast and low brightness, and FIG. 10E illustrates the LH sub-band image 1050 of the $5^{th}$ level DWT decomposition which has been generated from the image 1020 of FIG. 10B by performing the process of step S20 of FIG. 4 and using the same filters as described above in connection with FIG. 9. FIG. 10C is an image 1030 of a scene wherein the road comprises road lanes having different brightness. FIG. 10F illustrates the LH sub-band image 1060 of the $5^{th}$ level of the DWT decomposition which has been generated from the image 1030 shown in FIG. 10C by performing step S20 of FIG. 4 and using the same filters as described above in connection with FIG. 9. Despite the varying levels of brightness across the road, the region in the LH sub-band image 1060 in FIG. 10F that represents the unoccupied road area in FIG. 10C appears as an evenly dark region due to the high-pass filtering performed at the $5^{th}$ level of the DWT decomposition.

Although the dark region corresponding to the unoccupied area of the road is determined from the LH sub-band in the examples of FIGS. 9A to 9CA to 10F, the region can alternatively be determined from the HL or HH sub-band with similar effect. However, as illustrated in FIGS. 9A to 9C and 10A to 10F, the LH sub-band is suitable for determining the unoccupied road area when the image being processed is of the road in front of the vehicle and has been captured by a forward-facing camera mounted at a relatively low elevation. In this scenario, the left- and right-hand boundaries of the road (for example, the boundaries that separate the road from the neighbouring pavement or road barriers) are largely horizontal in the acquired image. These substantially horizontal boundaries are emphasised as white areas in the LH sub-band of the $5^{th}$ level of the DWT decomposition due to the application a high-pass filter along the columns of the LL sub-band image of $4^{th}$ level of the DWT decomposition. As a result, a dark region representing an unoccupied road area may be easily detectable in the LH sub-band image. As the characteristics of the image to be processed may vary (with, for example, a curvature of the road, the position of the vehicle relative to a road boundary, or the elevation of the vehicle-mounted camera), the orientation of the road boundaries that encompass the unoccupied road area may also vary. Under some circumstances, it may therefore be more appropriate to use the HL sub-band (which emphasises the vertical features in the image) or the HH sub-band (which emphasises the diagonal features in the image) for finding the dark region that corresponds to the unoccupied road area.

More generally, applying a high-pass filter to an LL sub-band image of a given level of the DWT decomposition of the image, which has been obtained by iteratively low-pass filtering and down-sampling the image as described above, can allow the unoccupied area of the road to be identified effectively. This is because the low-pass filtering operations tend to smooth out this region of the image to have pixels with a narrower range of pixel values than the remainder of the image, allowing the region to be easily distinguished from the remainder of the image by the action of the high-pass, which results in the region having more uniform and lower pixel values that the remainder of the image. In addition, the down-sampling performed in the iterative process that is used to generate the LL sub-band image significantly reduces the amount of data to be processed when determining the boundary of the region, allowing the unoccupied area of the road to be identified efficiently.

It is noted that, although the examples in FIGS. 9A to 9C and 10A to 10F are based on images captured by a forward-facing camera mounted on the vehicle, the image processing method described above may alternatively be applied to images of the road that have been captured by a side-facing or a rear-facing camera mounted on the car. Rear-view and side-view images are often taken to build a road occupancy map of the vehicle, which can be particularly useful for informing the driver of the presence of an object in a blind spot of the vehicle, for example. However, rear-view and side-view cameras used on vehicles are often wide-angle cameras that introduce a high level of distortion into the captured image. It is therefore often necessary to correct the acquired images for the distortion before the resulting distortion-corrected images can be seamlessly merged to produce the road occupancy map for the vehicle.

However, distortion correction and seamless merging operations have high complexity due to the requirement to perform affine transformation of all pixels in the image. Conventional approaches to generating road occupancy maps of this kind are therefore generally processor resource-intensive.

The unoccupied road area determination module 10 overcomes the above-identified short-coming of conventional approaches to generating road occupancy maps and allows a road occupancy map to be generated in a computationally inexpensive way. More particularly, when an image having high level of distortion is to be processed to generate a road occupancy map, the unoccupied road area determination module 10 may first process the image in accordance with the method of embodiment described above with reference to FIG. 4 (or one of the described variants) to generate boundary data indicative of a boundary of a region of the (distorted) image which represents an unoccupied area of the road. Affine transformation for correcting distortion can then be applied only to the (originally generated or a scaled version of the originally generated) boundary data, rather than to each pixel of the sub-band or input image, thereby allowing the unoccupied road area in the image to be accurately determined with significantly reduced computational complexity. The distortion-corrected boundary data can then be used to build a road occupancy map for the vehicle. For example, the unoccupied road area determination module 10 may combine boundary data obtained for each image of a plurality of images to generate the road occupancy map.

Referring again to FIG. 1, the unoccupied road area determination module 10 may, as in the present embodiment, comprise a refined boundary data generator module 16, which is arranged to generate refined boundary data indicative of the boundary of the region of the input image which represents the unoccupied area of the road. In particular, the boundary of the region representative of the unoccupied road area that is determined in step S30 in FIG. 4 may, in some cases, provide an overly conservative estimate of the boundary of the unoccupied road area, such that the determined boundary lies within an actual boundary of the unoccupied road area in the input image (as determined by inspecting the input image by eye). It may therefore be desirable to refine the boundary data determined from the $(N+1)^{th}$ level sub-band image in step S30 of FIG. 4 by using one or more sub-band images obtained at a lower-valued level of the DWT decomposition (i.e. a level of the DWT decomposition that provides a higher resolution sub-band image, which contains more detailed/higher spatial frequency components).

Figure 11:
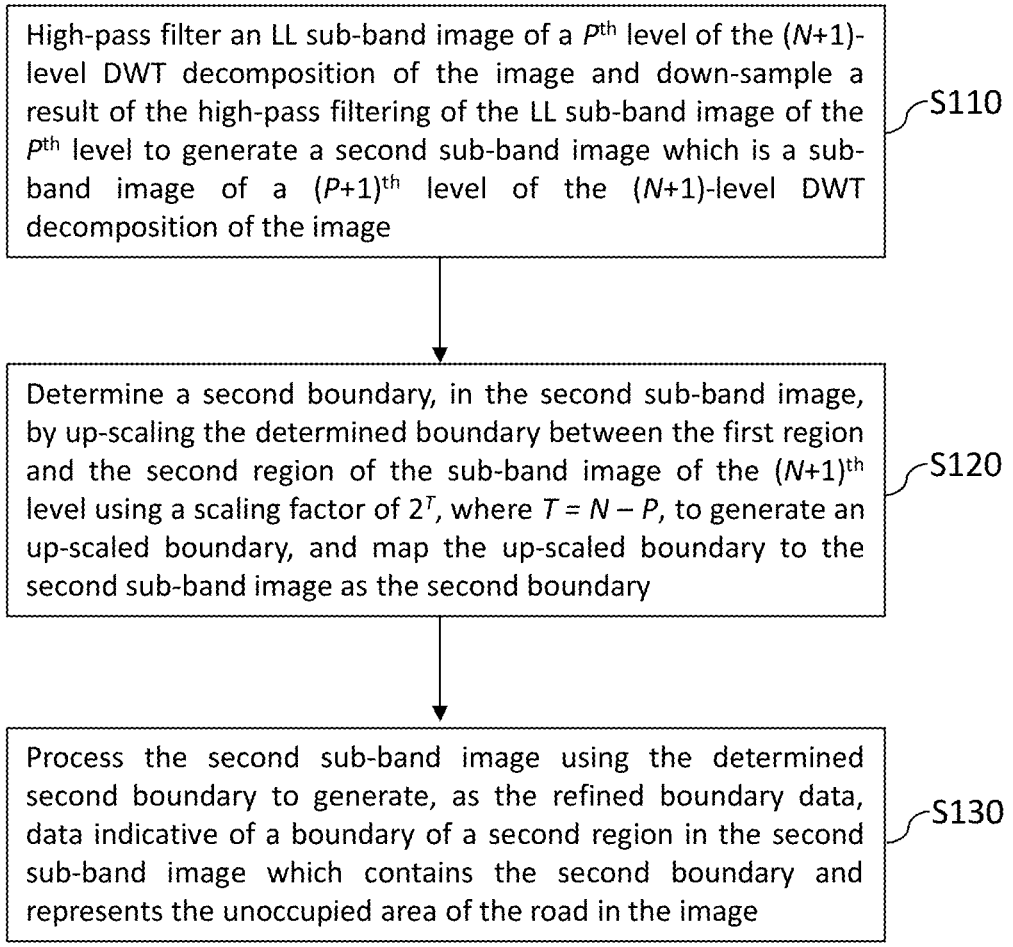
FIG. 11 illustrates a method performed by a refined boundary data generator module of the embodiment.

FIG. 11 illustrates a method performed by the refined boundary data generator module 16. In step S110 of FIG. 11, the refined boundary data generator module 16 generates refined boundary by high-pass filtering an LL sub-band image of a $P^{th}$ level of the (N+1)-level DWT decomposition of the image (where P is an integer smaller than N) and down-sampling a result of the high-pass filtering of the LL sub-band image of the $P^{th}$ level to generate a second sub-band image, which is a sub-band image of a $(P+1)^{th}$ level of the (N+1)-level DWT decomposition of the image. The LL sub-band image of the $P^{th}$ level may be generated using the same type of filters and using the same sequence of filtering as previously described for generating the LL sub-band of $N^{th}$ level in step S10 of FIG. 4. Similarly, the sub-band image of the $(P+1)^{th}$ level may be generated using the same type of filters and using the same sequence of filtering as previously described for generating the sub-band of the $(N+1)^{th}$ level in step S20 of FIG. 4.

In step S120 of FIG. 11, the refined boundary data generator module 16 up-scales the determined boundary of the region of the sub-band image of the $(N+1)^{th}$ level using a scaling factor of $2^T$, where T=N−P, to generate an up-scaled boundary, and maps the up-scaled boundary to the second sub-band image so to generate a second boundary, which is in the second sub-band image.

In step S130 of FIG. 11, the refined boundary data generator module 16 processes the second sub-band image using the determined second boundary to generate, as the refined boundary data, data indicative of a refined boundary of a second region in the second sub-band image, which contains (encompasses) the second boundary and represents the unoccupied area of the road in the image. The data indicative of the boundary of the second region may, as in the present embodiment, be generated by expanding (or modifying) the determined second boundary to further bound at least one region in the second sub-band image which is defined by adjacent pixels having substantially equal pixel values. The pixels in the at least one region of pixels may have pixels that are 'substantially equal' to each other in the sense of those pixel values having a smaller spread of pixel values (as quantified by their range, variance or standard deviation, for example) than a (identically defined) spread of pixel values among the pixels forming the remaining part of the second sub-band image.

In the present example, the values of N and P are selected to be 4 and 2, respectively, and the filtered sub-band image of the $(P+1)^{th}$ level that is generated in Step S110 of FIG. 11 is the LH sub-band image of the $3^{rd}$ level of the DWT decomposition (also referred to herein as the '$3^{rd}$ level LH sub-band image' or 'LH sub-band image of the $3^{rd}$ DWT level'). However, the value of P may be selected to be any integer value less than the value of N. Furthermore, the second sub-band image in step S110 of FIG. 11 is not limited to being the LH sub-band image, and may instead be any high-pass filtered sub-band image (including the HL sub-band image or the HH sub-band image), that is computed at a level of the DWT decomposition lower in value than the level of the DWT decomposition from which the initial boundary corresponding to the unoccupied road area has been determined (in step S30 of FIG. 4).

In step S120 of FIG. 11, the refined boundary data generator module 16 upscales the boundary of the region (representing the unoccupied road area) in the LH sub-band image of the 5$^{th}$ level of the DWT decomposition by a factor of 4 to generate the upscaled boundary that is then mapped to the LH sub-band image of the 3$^{rd}$ level of the DWT decomposition as the second boundary in step S120 of FIG. 11. The boundary of the region in the LH sub-band of the 5$^{th}$ level of the DWT decomposition may, as in the present embodiment, be upscaled by multiplying both the x-axis coordinates and the y-axis coordinates of the pixels defining the boundary by a factor of 4. It should be noted that the scaling factor of 4 is used in the present example as it represents the difference in scale between the resolution of the LH sub-band of the 3$^{rd}$ level of the DWT decomposition and the resolution LH sub-band of the 5$^{th}$ level of the DWT decomposition, due to the down-sampling that is performed at each level of two-dimensional multi-level DWT decomposition.

In step S130 of FIG. 11, the refined boundary data generator module 16 may, as in the present example, use the upscaled boundary in the 3$^{rd}$ level LH sub-band image and the 3$^{rd}$ level LH sub-band image itself to expand the upscaled boundary to further bound a region in the 3$^{rd}$ level LH sub-band image that crosses or touches the upscaled boundary and is defined by pixels having pixel values below a predetermined threshold. In other words, as part of step S130, the upscaled boundary in the LH sub-band image of the 3$^{rd}$ level of the DWT decomposition is expanded to include other dark regions neighbouring the upscaled boundary, in order to form the refined boundary of step S130 that encompasses the upscaled boundary. In this manner, the upscaled boundary, which is obtained by scaling the boundary found using the LH sub-band image of the 5$^{th}$ level of the DWT decomposition, is refined or expanded using more detailed information that is available in the LH sub-band image of the 3$^{rd}$ level of the DWT decomposition. The refined boundary determined in the LH sub-band image of the 3$^{rd}$ level therefore more accurately reflects the boundary of the region in the original (input) image of the road that represents the unoccupied road area.

Figure 12:
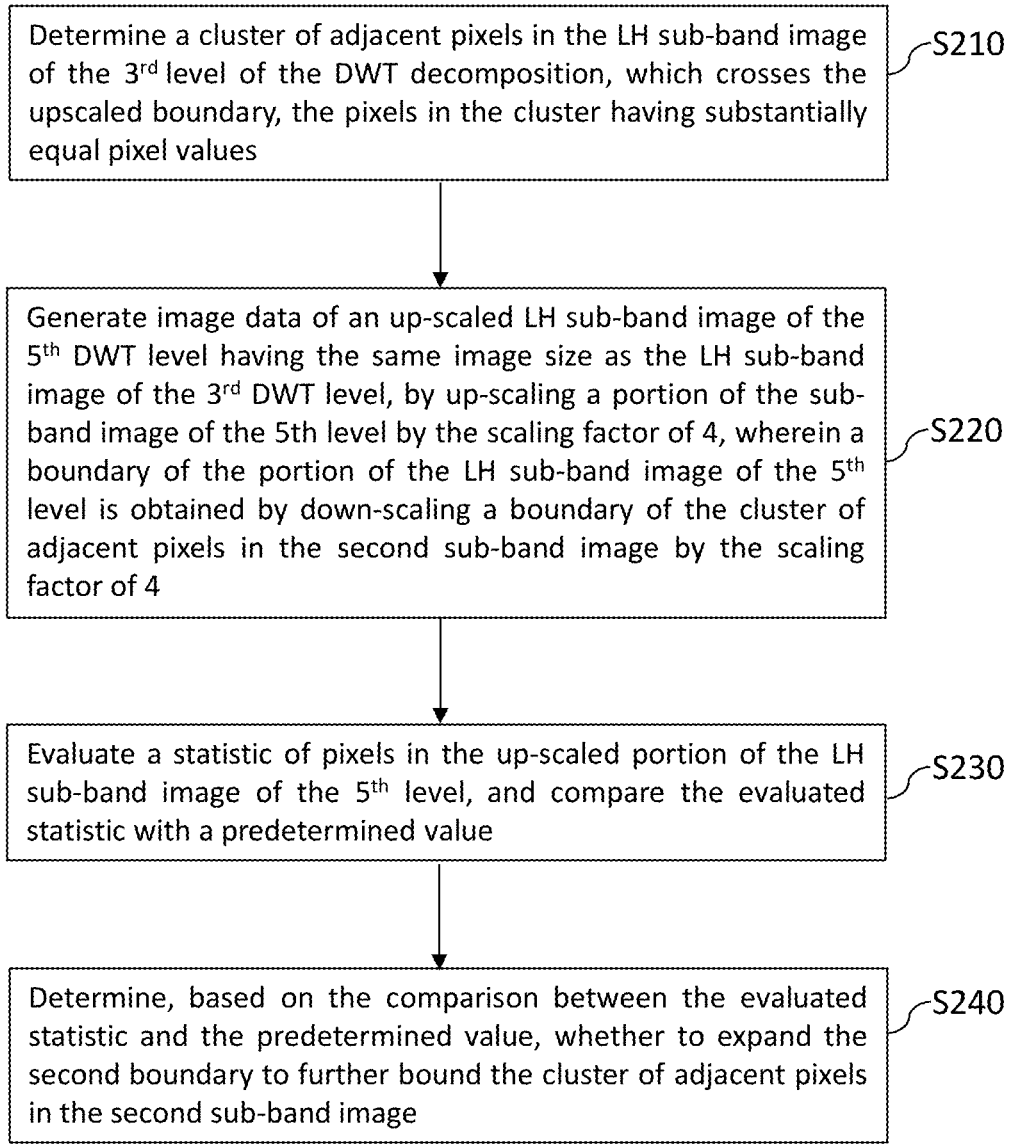
FIG. 12 illustrates a method of refining the boundary determined by the boundary data generator module, which is performed by the refined boundary data generator module of the embodiment.

FIG. 12 is a flow diagram illustrating a sequence of steps that may be performed, as part of step S130 of FIG. 11, to generate the refined (or expanded) boundary in the 3$^{rd}$ level LH sub-band image of the previously described example.

In step S210 of FIG. 12, the refined boundary data generator module 16 determines a cluster of adjacent pixels in the 3$^{rd}$ level LH sub-band image which touches or crosses the upscaled boundary, wherein the pixels in the cluster have substantially equal pixel values. In the present example, where no addition processing is performed beyond the steps of the DWT decomposition as described above, the regions of the 3$^{rd}$ level LH sub-band image representing the unoccupied road area will be substantially dark (having low pixel values). As such, the cluster of pixels will have substantially lower pixel values than pixels neighbouring the cluster.

In step S220 of FIG. 12, the refined boundary data generator module 16 generates image data of an up-scaled LH sub-band image of the 5$^{th}$ level having the same image size as the 3$^{rd}$ level LH sub-band image, by up-scaling a portion of the LH sub-band image of the 5$^{th}$ level by the same scaling factor as used at step S120, which is 4 in the present example. In this manner, each pixel of the cluster in the 3$^{rd}$ level LH sub-band image has a corresponding pixel in the upscaled portion of the 5$^{th}$ level LH sub-band image. The up-scaling may be performed using any suitable image scaling algorithm, such as, for example, nearest neighbour interpolation, or bilinear interpolation.

Furthermore, the portion of the sub-band image of the (N+1)$^{th}$ that is up-scaled is determined based on the locations of the pixels of the cluster in the second sub-band image, and a mapping between a location of each pixel of the second sub-band image with a location of a pixel of sub-band image of the (N+1)$^{th}$ level. More specifically, in the present example, for each pixel of the cluster in the 3$^{rd}$ level LH sub-band image, a corresponding pixel of the LH sub-band image of the 5$^{th}$ level is determined using the mapping, and up-scaled to generate the image data of the up-scaled LH sub-band image of the 5$^{th}$ level. Due to the difference in resolution between the LH sub-band image of the 3$^{rd}$ level and the LH sub-band image of the 5$^{th}$ level, the mapping between the location of each pixel in the LH sub-band image of the 3$^{rd}$ level and the location of the corresponding pixel in the LH sub-band image of the 5$^{th}$ level may, as in the present example, be a many-to-one mapping. As such, when multiple pixels of the cluster in the LH sub-band image of the 3$^{rd}$ level map to the same pixel in the LH sub-band image of the 5$^{th}$ level, that pixel in the LH sub-band image of the 5$^{th}$ level only needs to be up-scaled once.

In step S230 of FIG. 12, the refined boundary data generator module 16 evaluates a statistic of pixels in the up-scaled portion of the LH sub-band image of the 5$^{th}$ level, and compares the evaluated statistic with a predetermined value.

Then, in step S240 of FIG. 12, the refined boundary data generator module 16 determines, based on the comparison between the evaluated statistic and the predetermined value, whether to expand the upscaled boundary mapped to the 3$^{rd}$ level LH sub-band image to further bound the cluster of adjacent pixels in the 3$^{rd}$ level LH sub-band image.

The evaluation of the statistic of the pixels in the up-scaled portion of the 5$^{th}$ level LH sub-band image that is performed at step S230 of FIG. 12 may, as in the present embodiment, comprise evaluating the proportion of pixels in the up-scaled portion of the 5$^{th}$ level LH sub-band image whose pixel values are below a predetermined pixel value. Furthermore, as part of step S240, the refined boundary data generator module may, as in the present embodiment, compare the evaluated proportion with a predetermined threshold. Upon determining that the evaluated proportion exceeds the predetermined threshold, the refined data generator module may, as in the present embodiment, expand the upscaled boundary in the 3$^{rd}$ level LH sub-band image to include the dark cluster of pixels. However, if the evaluated proportion is below the predetermined threshold, the upscaled boundary in the 3$^{rd}$ level LH sub-band is not expanded to include the adjacent cluster.

It should be noted that the statistic evaluated in step S230 of FIG. 12 is not limited to the proportion of pixels having pixel values below a predetermined pixel value, and another statistical measures may alternatively be used to determine whether the upscaled boundary should be expanded to include the cluster. For example, the evaluation in step S230 of FIG. 12 may alternatively or additionally comprise evaluating a mean of pixel values in the up-scaled portion of the 5$^{th}$ level LH sub-band image, and step S240 may further comprise expanding the upscaled boundary in the 3$^{rd}$ level LH sub-band image to include the dark cluster of pixels only if the evaluated mean value is below a predetermined threshold for the mean value. Furthermore, in some embodiments, the evaluation in step S240 may alternatively or additionally comprise evaluating a variance of pixel values in the up-scaled portion of the 5$^{th}$ level LH sub-band image, and step S240 may further comprise expanding the upscaled boundary in the 3$^{rd}$ level LH sub-band image to include the dark cluster of pixels only if the evaluated variance is below a predetermined threshold for the variance.

In the present embodiment, upon determining the refined boundary using the LH sub-band of the 3$^{rd}$ level, the method of FIG. 12 may be repeated by upscaling the refined boundary to the sub-band image of a 2$^{nd}$ level of the DWT decomposition, and using the upscaled boundary in the sub-band image of the 2$^{nd}$ level, in conjunction with the sub-band image of the 2$^{nd}$ level, to further refine or expand the upscaled boundary in the sub-band image of the 2$^{nd}$ level in the same manner as described for the upscaled boundary in the LH sub-band of the 3$^{rd}$ level. That is, the refinement of the upscaled boundary in the sub-band image of the 2$^{nd}$ level can be performed by determining a dark cluster that touches the upscaled boundary in the sub-band image of the 2$^{nd}$ level, evaluating a statistics of the corresponding pixels in an upscaled portion of the LH sub-band image of the 3$^{rd}$ level, and determining whether to expand the upscaled boundary in the sub-band image of the 2$^{nd}$ level to include the dark cluster based the evaluation. In this manner, the boundary refinement process can be iteratively repeated by using sub-band images of low-valued DWT levels.

In some embodiments, where the vehicle-mounted camera is arranged to acquire, as the image, an image of a scene including the road and a horizon, the determination of whether to expand the second boundary to further bound the cluster of adjacent pixels in the second sub-band image may further be based on a vertical distance (i.e. along the y-axis direction in the image) of the cluster from the horizon in the image. In particular, dark clusters in proximity to the horizon are more likely to contain false data and may therefore not be used to expand the boundary.

In some embodiments, where the image acquired by the vehicle-mounted camera is of a section of a road containing one or more road markers, the initial boundary determined from the sub-band of the (N+1)$^{th}$ level of the DWT decomposition (the 5$^{th}$ level LH sub-band in the present example) at step S30 of FIG. 4, or the refined boundary that is determined from the sub-band of the (P+1)$^{th}$ level of DWT decomposition (the 3$^{rd}$ level LH sub-band in the present example) at step S130 of FIG. 11 (or a further refined boundary obtained by processing the 2$^{nd}$ level, as described above) can be used to define a search area within a sub-band image of the DWT decomposition, within which a search for boundary data indicative of a boundary around a region of the input image containing a road marker can be performed. In particular, using a sub-band image of the DWT decomposition to search for boundary data indicative of the boundary of the road marker region in the image of the road may allow the computational complexity of the search to be reduced, as the sub-band images are of a lower resolution compared to the original (input) image. Furthermore, by determining a boundary of a region representative of the unoccupied road in the sub-band of the (N+1)$^{th}$ level, and using the determined boundary (or a refined boundary that is obtained in accordance with the steps of FIG. 11) to define a search area in a sub-band image, within which the search for the road marker region is to be performed, the search can be made more efficient. This is because the search for the road marker region is limited to an area of the image representing the unoccupied road area, so that the available processing resources can focus on performing a search on only a part of the image where the road marker region can be located.

Accordingly, the apparatus in FIG. 1 may, as in the present embodiment, comprise a road marker determination module 20, which is arranged to process the input image to determine boundary data indicative of a boundary of a road marker region in the image of the road.

Figure 13:
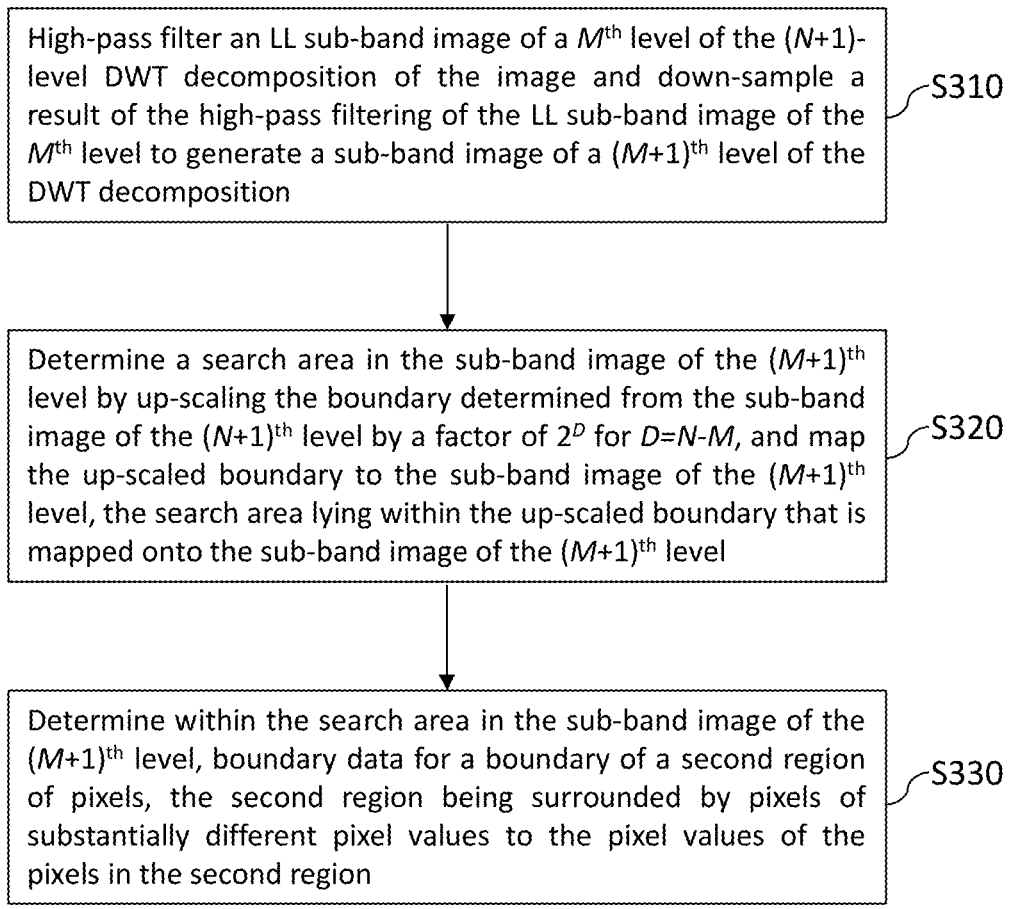
FIG. 13 illustrates a method performed by the road marker determination module of the embodiment to determine a boundary in a sub-band image that is indicative of a boundary of a road marker region in the image acquired by the vehicle-mounted camera.

FIG. 13 is a flow diagram illustrating a method performed by the road marker determination module 20 of FIG. 1. In step S310, the road marker determination module 20 high-pass filters an LL sub-band image of a M$^{th}$ level of the (N+1)-level DWT decomposition of the image and down-samples a result of the high-pass filtering of the LL sub-band image of the M$^{th}$ level to generate a sub-band image of a (M+1)$^{th}$ level of the DWT decomposition, wherein M is an integer less than value of N.

In step S320 of FIG. 13, the road marker determination module 20 determines a search area in the sub-band image of the (M+1)$^{th}$ level, by up-scaling the boundary determined from the sub-band image of the (N+1)$^{th}$ level by a factor of $2^D$, where D=N−M, and maps the up-scaled boundary to the sub-band image of the (M+1)$^{th}$ level. The search area lies within the up-scaled boundary that is mapped onto the sub-band image of the (M+1)$^{th}$ level.

In step S330 of FIG. 13, the road marker determination module 20 determines, within the search area in the sub-band image of the (M+1)$^{th}$ level, boundary data for a boundary of a region of pixels, the region surrounded by pixels of substantially different pixel values to the pixel values of the pixels in the region, and wherein the boundary of the region is indicative of the boundary of the road marker region in the image of the road. More specifically, the region in the sub-band image of the (M+1)-level may, as in the present embodiment, have pixels with pixel values that are substantially higher than those of the neighbouring pixels that are adjacent to the region. In addition, the region may have an average pixel value that is substantially higher than the average pixel value of neighbouring pixels of the region.

In step S310 of FIG. 13, the LL sub-band image of the M$^{th}$ level may be generated using the same type filters and using the same sequence of filtering as previously described in relation to step S10 of FIG. 4 for generating the LL sub-band of the N$^{th}$ level. More particularly, the LL sub-band of the M$^{th}$ level may be generated using one or more low-pass filters having a symmetrical sequence of filter coefficients, and the coefficients may further comprise integer valued coefficients. Furthermore, the coefficients of the low-pass filters may be set to the values in a row of Pascal's triangle in the same manner as previously described.

Furthermore, for step S310, the sub-band of the (M+1)$^{th}$ level may be generated using the same type filters and using the same sequence of filtering as previously described in relation to step S20 of FIG. 4 for generating the sub-band of the (N+1)$^{th}$ level. In particular, the sub-band of the (M+1)$^{th}$ level may be generated using one or more filters having a symmetrical sequence of filter coefficients, and the coefficients may further comprise integer valued coefficients. Moreover, the filters may be designed using the values of a row of Pascal's triangle in the same manner as described in previous embodiments.

Accordingly, all previous examples and embodiments described in relation to the generation of the LL sub-band of the N$^{th}$ level in step S10 of FIG. 4 also apply to the generation of the LL sub-band of the M$^{th}$ level that is processed in step S310 of FIG. 13. Similarly, all previous examples and embodiments described in relation to the generation of the (high-pass filtered) sub-band of the (N+1)$^{th}$ level in step S20 of FIG. 4 also apply to the generation of the sub-band of the (M+1)$^{th}$ level in step S310 of FIG. 13.

Figure 14A:
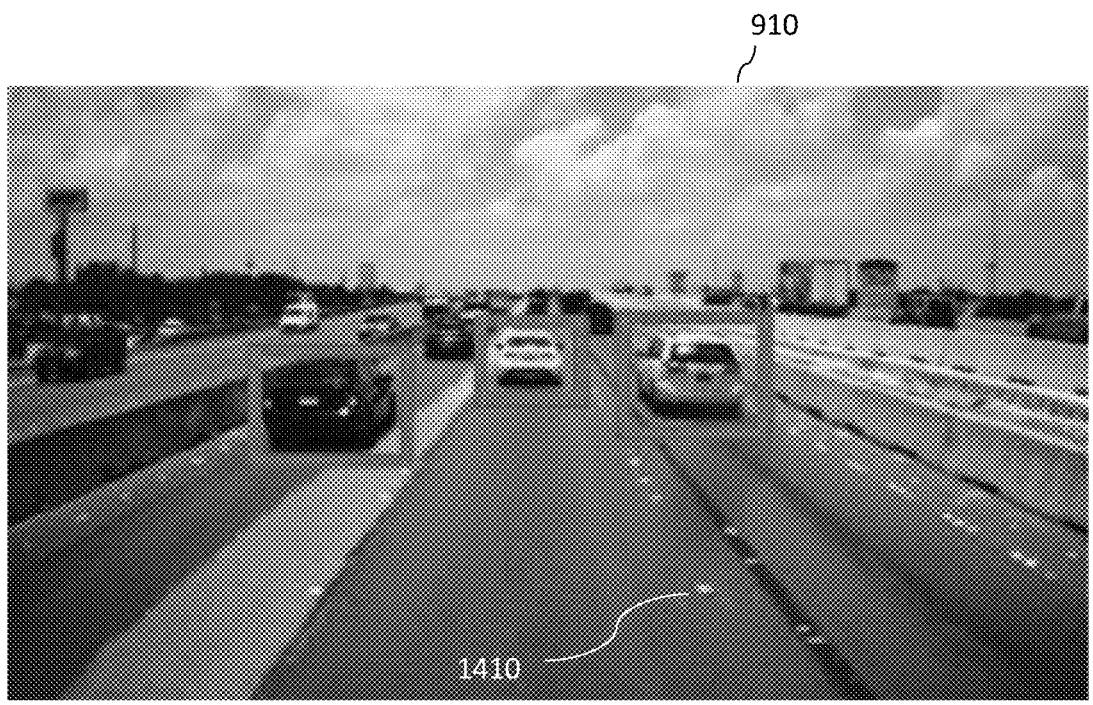
FIG. 14A illustrates an image of a road having road markers, that is processed by the road marker determination module of the embodiment.

FIG. 14A illustrates an image of a section of a road having road markers 1410 in the example form of Bott's dots.

However, the road markers 1410 may be of a different kind, for example cat's eyes road studs. In the present example, the image in FIG. 14A is processed by the road marker determination module of FIG. 1 in accordance with the steps described above with reference to FIG. 13.

Figure 14B:
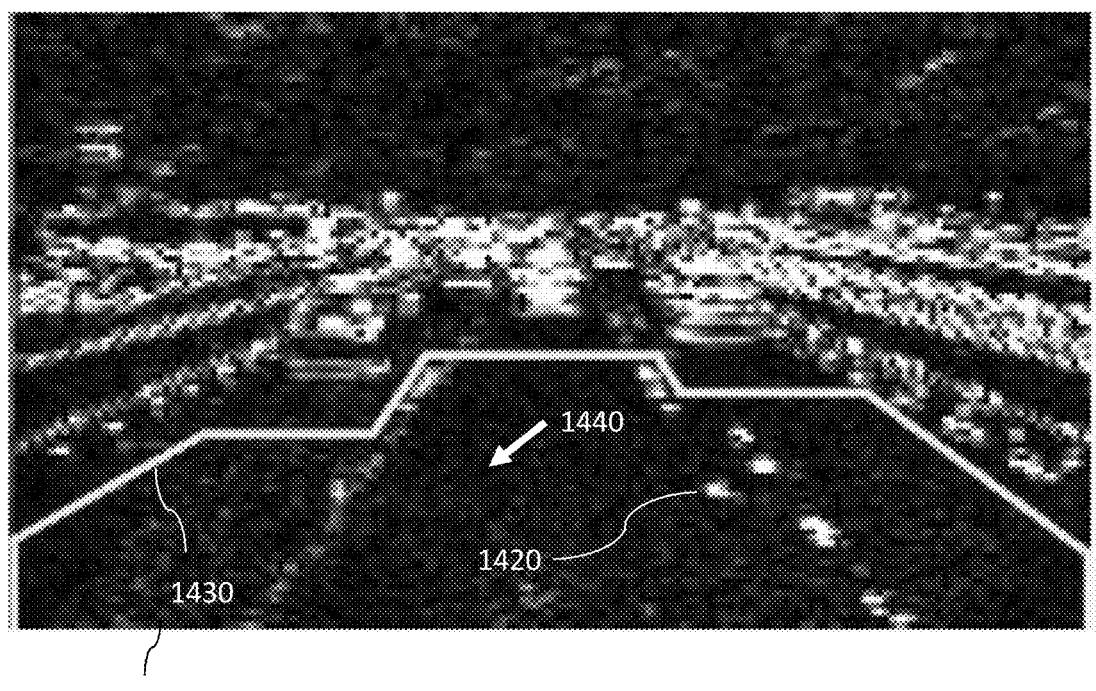
FIG. 14B illustrates a sub-band image that is generated from the image of FIG. 14A, the sub-band image showing road marker regions as bright spots on a dark region that corresponds to the unoccupied road area.

FIG. 14B illustrates an LH sub-band image of a $3^{rd}$ level DWT decomposition of the image in FIG. 14A, which has been generated by performing step S310 of FIG. 13. The LH sub-band image of the $3^{rd}$ level was generated using a low-pass filter having filter coefficients [1, 6, 15, 20, 15 6, 1] and a high-pass filter having filter coefficients [1, −6, 15, −20, 15 −6, 1]. However, the sub-band image of the $(M+1)^{th}$ level generated in step S310 is not limited to the LH sub-band and may alternatively be selected as HL sub-band image or the HH sub-band. The choice of the particular sub-band may be based on the expected shape or orientation of the road marker in the image captured by the camera. In the present example, the road marker 1410 in the image is a Botts' dot which, as illustrated in FIG. 14A, appears as a substantially ellipsoidal object that is elongated in the horizontal (x−) direction in the image. Therefore, applying a high-pass filter along the columns of the LL sub-band image of the $4^{th}$ level to generate the LH sub-band image of the $3^{rd}$ level serves to highlight the horizontal features in the input image and, at the same time, removes the low-frequency components corresponding to the unoccupied road area, so that the road marker 1410 appear as a bright object 1420 in the LH sub-band image of FIG. 14B. As such, the LH sub-band image is particularly suitable determining the location of a Botts' dot.

In the present example, in step S320 of the FIG. 13, the road marker determination module 20 upscales, by a factor of 4, the boundary of the region representing the unoccupied road area that is found using the LH sub-band of the $5^{th}$ DWT level (in step S30 of FIG. 4), in order to generate the upscaled boundary that is then mapped to the LH sub-band image of the $3^{rd}$ level (that is generated at step S310 of FIG. 13). The boundary of the region (representative of the unoccupied road area) in the LH sub-band of the $5^{th}$ level may, as in the present example, be upscaled by multiplying the x- and y-coordinates of the pixels defining the boundary by a factor of 4. The upscaled boundary that is mapped onto the LH sub-band image of the $3^{rd}$ level defines a search area within which the search for the boundary of the region of indicative of the boundary of the road marker is to be performed.

FIG. 14B illustrates the upscaled boundary 1430, which is obtained by up-scaling the coordinates of the boundary found at the LH sub-band of the $5^{th}$ level and mapping the upscaled boundary onto the LH sub-band of the $3^{rd}$ DWT level. In addition, in FIG. 14B, a search area 1440 is defined as region of the LH sub-band image that lies within the upscaled boundary 1430. It should be noted that, although the search area 1440 in the present example is defined by directly up-scaling the boundary found using the LH sub-band of the $5^{th}$ level, in some embodiments, the upscaled boundary 1430 may be further refined or expanded by the refined boundary data generator module 16 in accordance with steps described above with reference to FIG. 11. The refined, upscaled boundary may then be used to define the search area in the LH sub-band image of the $3^{rd}$ level.

In step S330 of FIG. 13, the road marker determination module 20 may, as in the present example, determine the boundary of the region in the $3^{rd}$ level LH sub-band image that is indicative of the boundary of the road marker by using a similar approach to the methods described in relation to step S30 of FIG. 4 for determining the boundary of the region representative of the unoccupied road area. More specifically, in step S30 of FIG. 4, a boundary is determined around a substantially dark region of the $5^{th}$ level LH sub-band image. In contrast, each road marker 1410 in the input image is represented by a substantially brighter region/spot 1420 in the $3^{rd}$ level LH sub-band image. Therefore, the algorithm described herein with reference to FIG. 7A can be easily adapted to detect a boundary in the LH sub-band image of the $3^{rd}$ level that is indicative of a road marker boundary.

More specifically, in the present example, determining the boundary indicative of the boundary of the road marker in step S330 is performed by the road marker determination module 20 first determining, within the area of the $3^{rd}$ level LH sub-band image that lies within the upscaled boundary, a pixel location of a pixel of the LH sub-band image of the $3^{rd}$ level whose pixel value exceeds a predetermined pixel threshold. The determination of this pixel location may be done iteratively by checking each pixel of the LH sub-band image until a pixel whose pixel value falls below the predetermined pixel threshold is determined. Upon determining the pixel location, the road marker determination module 20 further executes a contour tracing algorithm using the determined pixel location to identify the boundary a region that indicative of the road marker boundary. In particular, the boundary of the region separates pixels of the region which are adjacent to the boundary and have pixel values above the predetermined pixel threshold, from pixels outside the boundary which are adjacent to the boundary and have pixel values above the predetermined threshold. Any suitable boundary/contour tracing algorithm may be used in this regard, such as for example, the Moore-neighbour-tracing, the radial sweep and the square tracing algorithm.

In some embodiments, upon determining from the LH sub-band image of the $3^{rd}$ level, the boundary indicative of the road marker boundary, the road marker determination module 20 may further define a boundary of the road marker region in the input image that has been acquired by the camera. In particular, the road marker determination module 20 may up-scale the boundary indicative of the road marker region in the LH sub-band of the $3^{rd}$ level by a factor of 8 (corresponding to the different in scale between the resolution of the original image of the road and the resolution of the LH sub-band of the $3^{rd}$ level) to generate an up-scaled road marker boundary, which is then mapped onto the image as the defined boundary of the road marker region.

The road marker determination module 20 may further be arranged to determine whether a portion of the image within the defined boundary of the road marker region represents the road marker on the road. For example, the road marker determination module 20 may correlate the portion of the image within the defined boundary of the road marker region with one or more stored images of a road marking. Alternatively, the road marker determination module 20 may input the portion of the image within the defined boundary of the road marker region into a trained statistical classifier, such as a convolutional neural network (CNN), for example.

In some embodiments, non-linear pre-processing may be performed to normalise the $3^{rd}$ level LH sub-band image before determining the boundary indicative of the road marker boundary. More specifically, the road marker determination module 20 may be arranged to apply a scaling factor to the pixel value of each pixel of the LH sub-band image and saturate scaled pixel values that are above a pixel saturation threshold, before generating the boundary in the $3^{rd}$ level LH sub-band image that is indicative of the boundary of the road marker region in the image. For example, the scaling factor may be multiplied with the pixel value of each pixel of the $3^{rd}$ level LH sub-band image and the scaled pixel value may be converted into an 8-bit grey-scale value, such that scaled pixel values that are above 255 are saturated. The process of scaling followed by saturation has the effect of normalizing the LH sub-band image and improving its contrast, thus making the subsequent boundary determination process more robust to varying lighting conditions (i.e. varying contrast, brightness, and noise). In addition, the normalization can be achieved efficiently by simple multiplication operations, which is more computationally efficient than if non-linear filters were used to perform the normalization.

Furthermore, in some embodiments, the road marker determination module 20 may be arranged to apply a binary thresholding operation to the LH sub-band image of the $3^{rd}$ level before determining the boundary of the region the LH sub-band image that is representative of the boundary of the road marker region. Applying a binary thresholding operation to the LH sub-band image may allow the bright regions corresponding the road marker regions to be more accurately determined from the LH sub-band image.

It should be noted that, although the boundary found in the LH sub-band of the $3^{rd}$ level is upscaled to the input image in the present example, the boundary may alternatively be upscaled to a sub-band of the $1^{st}$ level or any DWT level higher than the level at which the boundary indicative of the road marker boundary is initially found.

In embodiments having both the refined boundary data generator module 16 and the road marker determination module 20 shown in FIG. 1, and wherein the value of P in step S110 of FIG. 11 is the same as the value of M in step S310 of FIG. 13, then step S310 does not need to be performed again if step S110 of FIG. 11 has already been performed. Instead, the output of step S110 may be reused as the output of step S310.

It should be noted that, although the road marker determination module 20 in the present embodiment makes use of a boundary found from an LH sub-band image of the $5^{th}$ level in order to define a search area in an LH sub-band image of the $3^{rd}$ level, in some embodiments, the road marker determination module 20 may directly search for the boundary indicative of the boundary of the road marker region in the LH sub-band image of the $3^{rd}$ level, without initially defining a search area using the boundary (representing the boundary of the unoccupied road area) that is found in the LH sub-band image of the $5^{th}$ level.

That is, in some embodiments, the road marker determination module 20 may function as a stand-alone image data processor that functions independently of the unoccupied road area determination module 10 in FIG. 1. When operating independently, the road marker determination module 20 may be arranged to process an image of a scene including a road having a road marker, which has been acquired by a camera mounted on a vehicle, to generate boundary data indicative of a boundary of a road marker region of the image which represents the road marker.

In particular, the road marker determination module 20, when functioning as a stand-alone image data processor, comprises a discrete wavelet transform (DWT) decomposition module that is arranged to generate an LL sub-band image of an $M^{th}$ level of an (M+1)-level discrete wavelet transform, DWT, decomposition of the image by performing an iterative process of iteratively low-pass filtering and down-sampling the image M times, where M is an integer equal to or greater than one. The DWT decomposition module is further arranged to generate a sub-band image of an $(M+1)^{th}$ level of the (M+1) level DWT decomposition of the image by high-pass filtering the LL sub-band image of the $M^{th}$ level, and down-sampling a result of the high-pass filtering. In addition, the road marker determination module further comprises a boundary data generator module that is arranged to generate the boundary data by determining a boundary of a region of pixels of the sub-band image of the $(M+1)^{th}$ level. The region of pixels is surrounded by pixels of substantially different pixel values to the pixel values of the pixels in the region. The boundary of the region is indicative of the boundary of the road marker region in the image of the road.

The DWT decomposition module of the road marker determination module 20 (when functioning as a stand-alone image data processor) may be arranged to generate the LL sub-band image of the $M^{th}$ level in the same manner that the DWT decomposition module 12 of the unoccupied road area determination module 10 is configured to generate its LL sub-band image of the $N^{th}$ level. Furthermore, the DWT decomposition module of the road marker determination module 20 (when functioning as a stand-alone image data processor) may be configured to generate the sub-band image of the $(N+1)^{th}$ level in the same manner that the DWT decomposition module 12 of the unoccupied road area determination module 10 is arranged to generate its sub-band image of the $(N+1)^{th}$ level. All embodiments, examples and variations described in relation to steps S10 and S20 in FIG. 4 are also applicable to the DWT decomposition module of the road marker determination module 20 (when functioning as a stand-alone image data processor). Furthermore, the boundary data generator module of the road marker determination module 20 (when functioning as a stand-alone image data processor) may be arranged to generate the boundary data indicative of the boundary of the road marker region by using the same method as described above, in step S330 of FIG. 13.

Furthermore, all embodiments and variants previously described in relation to the road marker determination module 20 in FIG. 1 are embodiments and variants of a road marker determination module 20 that functions as a standalone image data processor, with the only difference being that the boundary indicative of the boundary of the road marker region is determined in the sub-band image of the $(M+1)^{th}$ level without defining a search area in the sub-band image of the $(M+1)^{th}$ level using a boundary found from a lower level sub-band image.

The apparatus 1 may use information derived from images captured by the vehicle-mounted camera while the vehicle is being driven along a road to determine the speed of the vehicle. The determination of vehicle speed by the apparatus 1 may be performed in parallel with the vehicle's conventional vehicle speed measurement, which is based on angular velocity of its wheels. These independent measurements of vehicle speed can improve safety and is particularly important in autonomous driving.

The apparatus 1 may, as shown in FIG. 1, further comprise a vehicle speed detection module 30 for determining a speed of the vehicle while the vehicle is travelling along a road, by processing pairs of images of the road that have been captured by the vehicle-mounted camera. Each of the pairs of images has a common image coordinate system and comprises a first image of the road and a second image of the road. The first image is captured at a first time instant, and the second image is captured at a second time instant, which is a predefined time period after the first time instant. The first image and the second image comprise respective road marker images of a road marker (or a lane marker) on the road.

Figure 15:
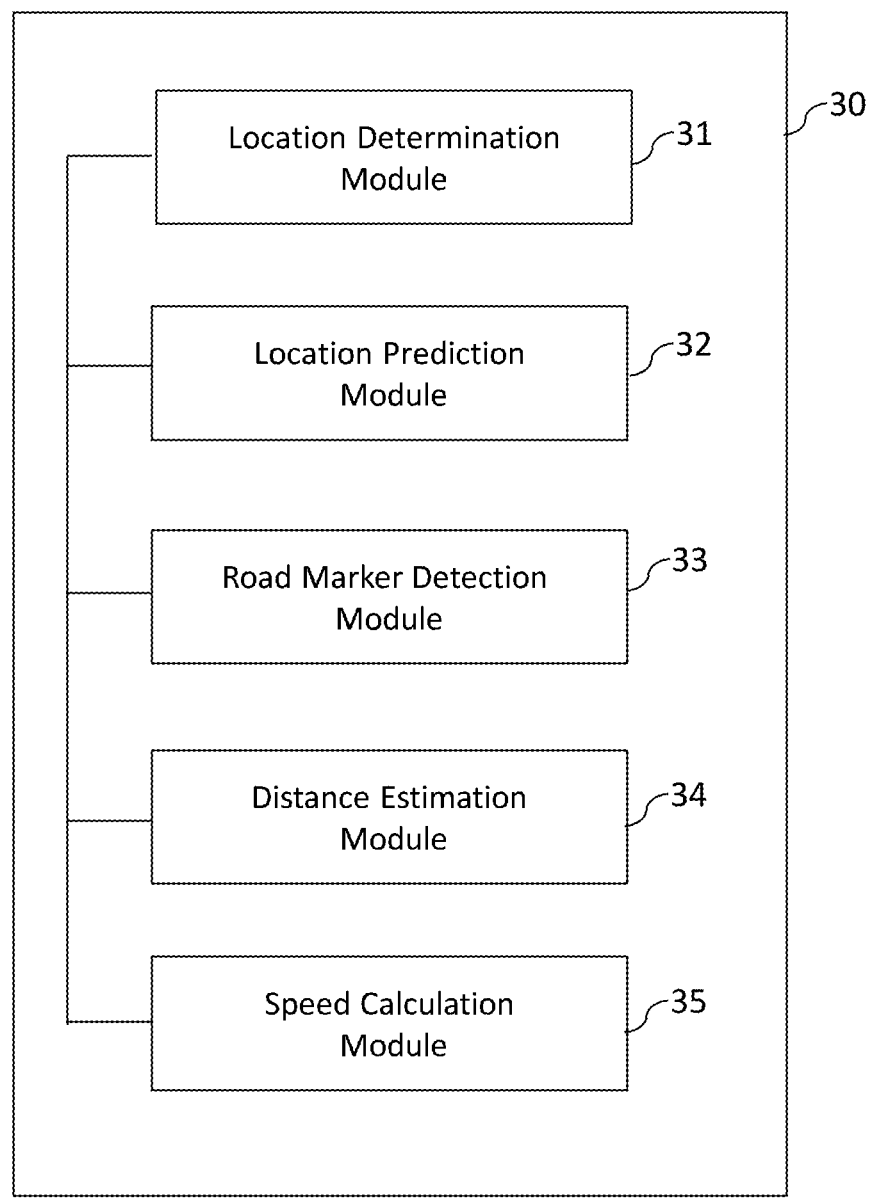
FIG. 15 illustrates components of the vehicle speed detection module shown in FIG. 1.

FIG. 15 illustrates components of the vehicle speed detection module 30 shown in FIG. 1. As shown in FIG. 15, the vehicle speed detection module 30 comprises a location determination module 31 arranged to determine a location, in the image coordinate system, of the road marker image in the first image. The vehicle speed detection module further comprises a location prediction module 32, which is arranged to predict a location, in the image coordinate system, of an image of the road marker in the second image, using the determined location of the road marker image, an estimate of the speed of the vehicle, and the predefined time period. The vehicle speed detection module 30 further comprises a road marker image detection module 33, which is arranged to detect an image of the road marker in a portion of the second image at the predicted location. Furthermore, the vehicle speed detection module 30 comprises a distance estimation module 34, which is arranged to estimate a distance by which the vehicle has travelled along the road during the predefined time period using the determined location of the road marker in the first image, and a location of the detected image of the road marker in the portion of the second image. The vehicle speed detection module 30 further comprises a speed calculation module 35 arranged to calculate the speed of the vehicle based on the estimated distance and the predefined time period.

Figure 16:
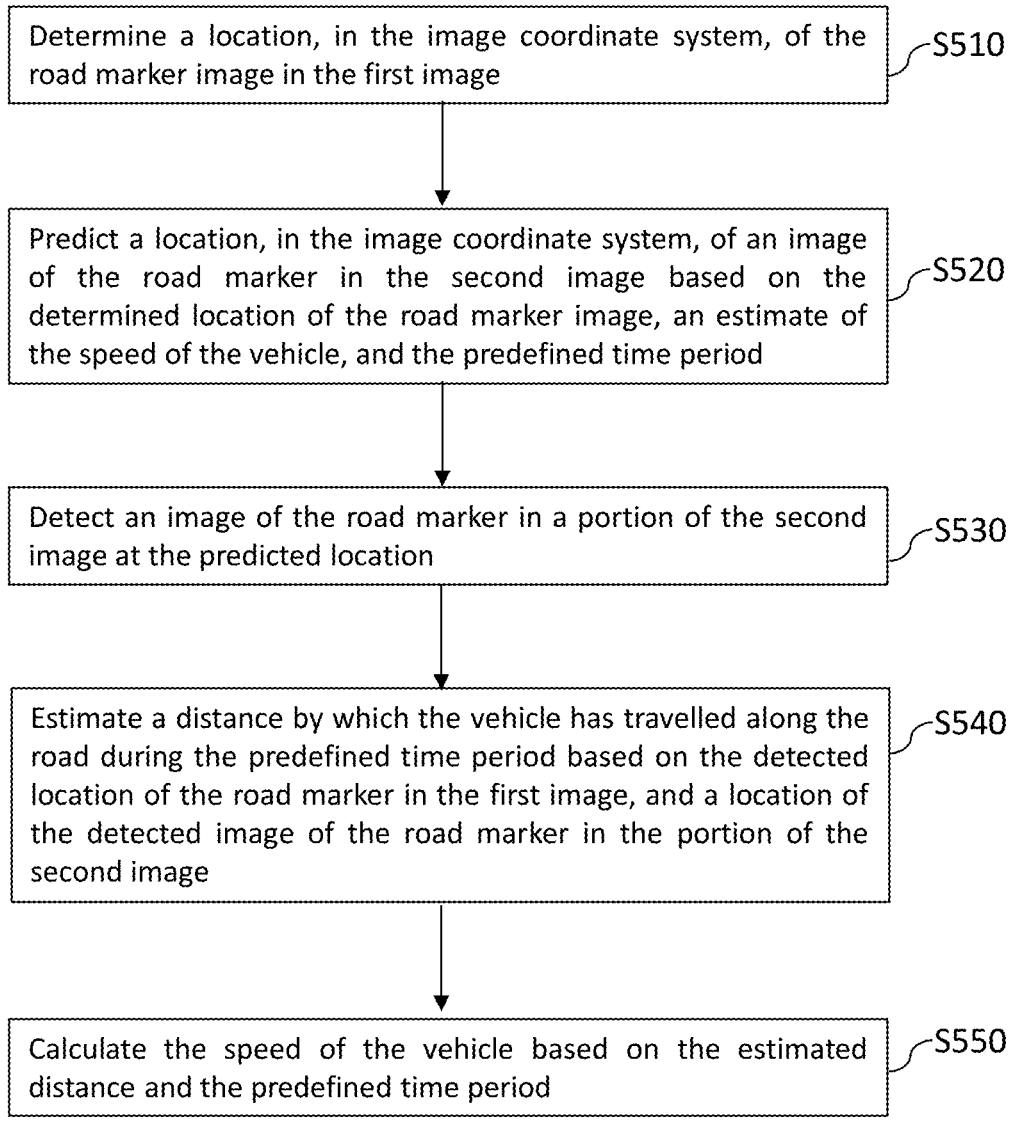
FIG. 16 is a flow diagram illustrating a method of determining the speed of the vehicle which is performed by the vehicle speed detection module of FIG. 15.

FIG. 16 illustrates a method of determining the speed of the vehicle that is performed by the vehicle speed detection module 30 of FIG. 15.

In step S510 of FIG. 16, the location determination module 31 determines a location, in the image coordinate system, of the road marker image in the first image captured by the camera. The location of the road marker image in the first image may, as in the present example, be determined using the method performed by the road marker determination module 20 of FIG. 1.

More specifically, the location determination module 31 may, for example, determine the location of the road marker image in the first image is by generating an LL sub-band image of an $M^{th}$ level of an (M+1)-level discrete wavelet transform, DWT, decomposition of the first image by iteratively low-pass filtering and down-sampling the first image M times, where M is an integer equal to or greater than one. The location determination module 31 of the present embodiment further generates a sub-band image of an $(M+1)^{th}$ level of the (M+1) level DWT decomposition of the first image, by high-pass filtering the LL sub-band image of the Nth level, and down-sampling a result of the high-pass filtering. In addition, the location determination module 31 may generate boundary data indicative of a boundary of the road marker region of the first image, by determining a boundary of a region of pixels of the sub-band image of the $(M+1)^{th}$ level, the region of pixels having substantially equal pixel values and surrounded by pixels of substantially different pixel values to the pixel values of the pixels in the region. The location determination module 31 of the present embodiment further determines the location of the road marker image in the first image by upscaling the boundary of the region of pixels of the sub-band image of the $(M+1)^{th}$ level by a factor of $2^{M+1}$.

The location determination module 31 may perform the DWT decomposition and generate the boundary data indicative of the boundary of the road marker region in the same manner as previously described for the road marker determination module 20 in FIG. 1. In particular, the location determination module 31 may generate the LL sub-band of the $M^{th}$ level in the same way as the road marker determination module 20. Furthermore, the location determination module 31 may generate the sub-band of the $(M+1)^{th}$ level in the same way as the road marker determination module 20. In addition, the location determination module 31 may generate the boundary data in the same way as the road marker determination module 20. All embodiments and examples of the road marker determination module 20 described above are therefore examples of the location determination module 31. It should be understood, however, that the location of the road marker need not be determined using the method or one of its variants set out above, and that another method may alternatively be employed.

In step S520 of FIG. 16, the location prediction module 32 predicts a location, in the image coordinate system, of an image of the road marker in the second image. The prediction is based on the determined location of the road marker image in the first image, an estimate of the speed of the vehicle, and the predefined time period between first time instant at which the first image was captured and the second time instant at which the second image was captured. For example, in an embodiment where the camera is a side-view camera which is arranged to capture, as the first and second images, images of the road to a side of the vehicle as the vehicle travels along the road, the location prediction module 32 may use a mapping such as a linear mapping (in the form of a linear function or look-up table that linearly relates an input variable to a look-up entry, for example) to map an estimate of distance travelled by the vehicle along the road (obtained by multiplying the estimate of the speed of the vehicle by the predefined time period) to a corresponding displacement in the image coordinate system. This mapping may be obtained in any suitable way, for example by measuring distances between differently spaced objects in a field-of-view of the camera and corresponding distances in the image coordinate frame of the objects in acquired camera images, and correlating the measured distances to obtain the mapping. The location (in the image coordinate system) of the image of the road marker in the second image may be predicted by adding the determined displacement to the determined location of the road marker image in the first image.

The predicted location of the image of the road marker in the second image may thus be predicted using a mapping between a first variable, which is indicative of a position in the image coordinate system of a portion of the image, and second variable, which is indicative of a distance (along a direction of travel of the vehicle) from the vehicle of a portion of the road represented by the portion of the image.

In the present embodiment, the camera is arranged to capture, as the first and second images, images of the road ahead of the vehicle as the vehicle travels along the road, and the mapping (between the first variable and the second variable) is, in this case, a non-linear mapping, which may be obtained in a similar way as the linear mapping discussed above.

In step S530 of FIG. 16, the road marker image detection module 33 detects an image of the road marker in a portion of the second image at the predicted location. The portion of the second image may, as in the present embodiment, be a region of the second image which comprises the predicted location or has a pre-defined spatial relationship with the predicted location. Moreover, the portion of the second image is a sub-region of the second image in the present embodiment. By detecting the image of the road marker within only a portion (namely, a sub-region) of the second image which is at the predict location, rather searching for the image of the road marker within the entire second image, the processing complexity of the road marker detection in the second image can be significantly reduced.

In step S530 of FIG. 16, the detection of the road marker image in the portion of the second image at the predicted location is performed using the method that is also used to determine the location of the road marker image in the first image, namely by determining at least a part of a boundary of the road marker image using the method described above with reference to the road marker determination module 20 of FIG. 1. However, it should be understood that the detection of the image of the road marker in the portion of the second image may alternatively be performed using any suitable method, and the detection may more generally comprise applying any suitable method to detect the location of one or more pixels of the road marker image in the second image.

In alternative embodiment, instead of determining the location of the road marker image in the second image by determining boundary data of the road marker as described above, the road marker detection module 33 may alternatively calculate a cross-correlation between a portion of the first image at the determined location and a portion of the second image at the predicted location. The result of the cross-correlation calculation can be used to detect, and determine the location of, the image of the road marker in the portion of the second image. The location of the portion of the second image (which is correlated with the portion of the first image at the determined location) in the image coordinate system may, as in the present embodiment, be based on (have a predefined relationship with) the predicted location of the road marker image. For example, the portion of the second image at the predicted location may be a sub-region of the second image that comprises the predicted location. By cross-correlating the portion of the first image at the determined location and only a portion (i.e. a sub-region) of the second image at the predicted location, the complexity of the process of detecting the road marker in the second image can be significantly reduced because the cross-correlation is performed using the pixels of the second image where the road marker is likely to be, thereby avoiding the more computationally demanding task of cross-correlating the first and second images as a whole.

In step S540 of FIG. 16, the distance estimation module 34 estimates a distance by which the vehicle has travelled along the road during the predefined time period, based on the determined location of the road marker image in the first image and the determined location of the road marker in the portion of the second image. More specifically, the estimation of the distance by which the vehicle has moved may, as in the present embodiment, be further based on the mapping between the first variable indicative of a position in the image coordinate system of a portion of the image, and second variable that is indicative of a distance from the vehicle (along a direction of travel) of a portion of the road represented by the portion of the image. For example, in some embodiments, the distance estimation module 34 may use the determined location of the road marker in the first image and the mapping to determine a first value that is indicative of a distance from the vehicle of a road marker that appears at the determined location of the road marker image in the first image. The distance estimation module 34 may further use the determined location of the road marker image in the second image and the mapping to determine a second value that is indicative of a distance from the vehicle of a road marker that appears at the determined location of the road marker image in the second image. The distance estimation module 34 may then estimate the distance by which the vehicle has travelled along the road during the predefined time period by calculating a difference between the first value and the second value.

In step S550 of FIG. 16, the speed calculation module 35 calculates the speed of the vehicle based on the distance estimated in step S540 and the predefined time period, specifically by dividing the estimated distance by the predetermined time period.

Figure 17A:
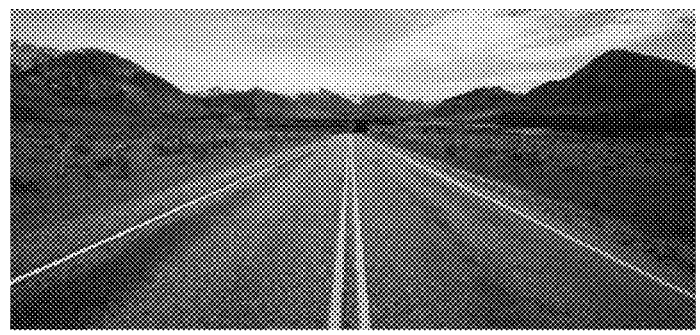
FIG. 17A shows an image captured by a front-facing camera mounted on a vehicle.
Figure 17B:
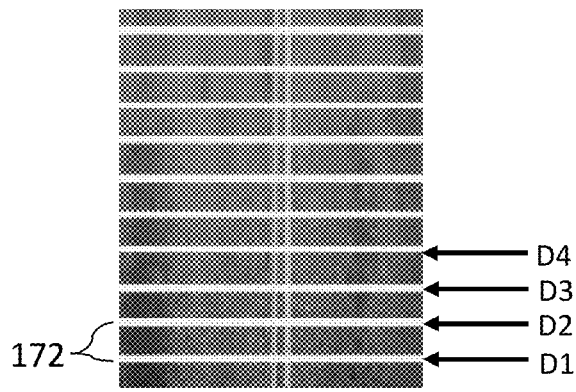
FIG. 17B is a birds-eye-view image of the road obtained by transforming the image of FIG. 17A and adding equally-spaced, horizontal lines.

FIG. 17A illustrates an image of a scene comprising a road, which has been captured by a front-view camera mounted on a vehicle. FIG. 17B illustrates a birds-eye-view image of a road, which has been obtained by applying a transformation matrix to the image in FIG. 17A. In the images of FIG. 17A and FIG. 17B, the (0,0) coordinate is located at the bottom left corner of each image. In FIG. 17B, distances from the vehicle of points along the road increase with increasing Y-axis values of locations in the image which represent the points along the road. Furthermore, the birds-eye-view image of FIG. 17B has been marked with a plurality of horizontal lines 172 that are equally spaced along the vertical axis of the birds-eye-view image. Each horizontal line 172 is located at a respective location along the vertical axis that represents a respective distance from the vehicle. In FIG. 17B, the labels D1, D2, D3 and D4 denote four different distances of points on the road from the vehicle, which are represented by the four respectively-labelled horizontal lines.

Figure 17C:
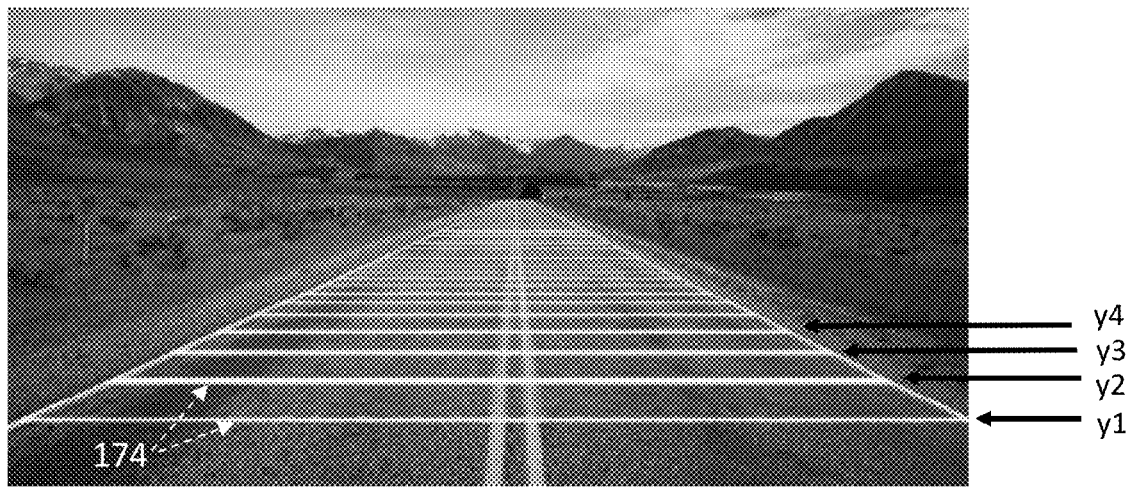
FIG. 17C illustrates an image of the road after an inverse perspective transformation has been applied to the birds-eye-view image shown in FIG. 17B.

FIG. 17C illustrates an image of the road after an inverse perspective transformation has been applied to the marked birds-eye-view image in FIG. 17B. In FIG. 17C, the Y-axis location of the horizontal lines 174 are derived from inverse perspective transformation of the Y-coordinate location of the horizontal lines 172 in the birds-eye-view image of FIG. 17B, such that the horizontal lines 172 of FIG. 17B at distances D1, D2, D3 and D4 from the vehicle are respectively mapped to the horizontal lines 174 of FIG. 17C at y-axis locations y1, y2, y3 and y4. As shown in FIG. 17C, the density of the horizontal lines 174 is higher in parts of the image in FIG. 17C that represent sections of the road that are located further away from the vehicle, thus illustrating a non-linear mapping between the Y-axis position of a portion of the image in FIG. 17B, and a distance from the vehicle of a portion of the road represented by the portion of the image.

Figure 18:
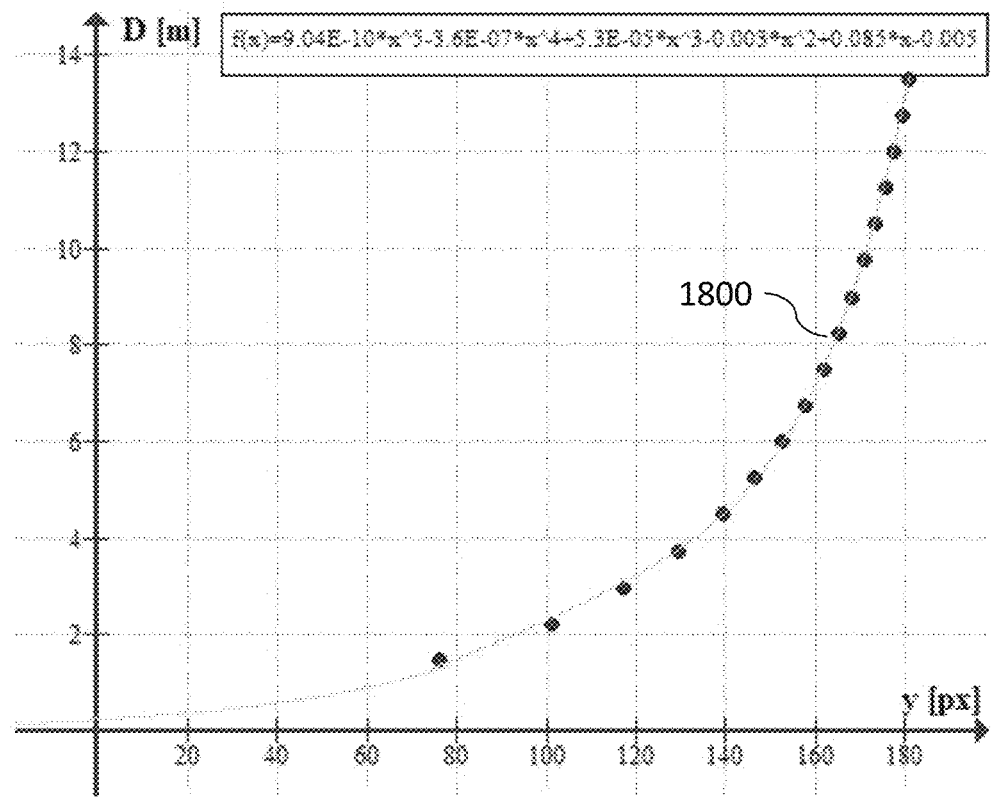
FIG. 18 illustrates a mapping between values of the Y-axis coordinate of pixels of the image and distances from the vehicle of portions of the road represented by the pixels.

FIG. 18 illustrates a mapping 1800 between a Y-axis coordinate of the image in FIG. 17C, and a distance from the vehicle of a portion of road represented by a pixel at the Y-axis coordinate of the image in FIG. 17C. The mapping 1800 in FIG. 18 is an example of a mapping that may be used in the performance of step S520 and/or step S540.

Figure 19A:
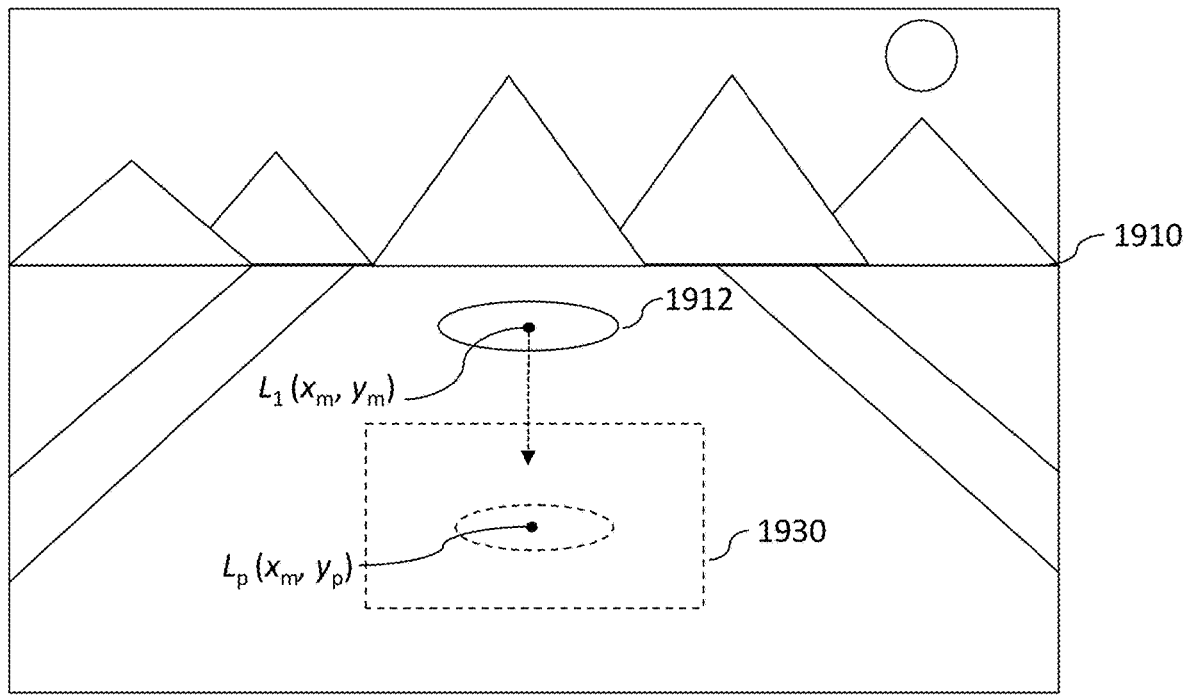
FIG. 19A illustrates a first image comprising an image of a road marker, which has been captured by a vehicle-mounted camera at a time instant.
Figure 19B:
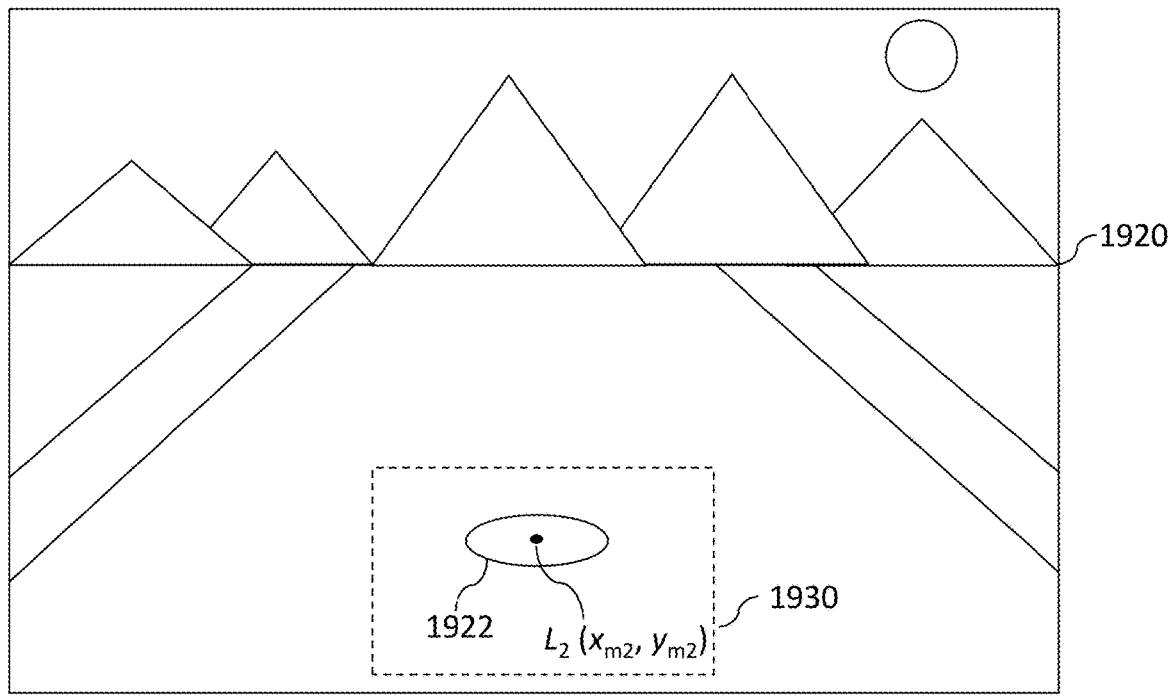
FIG. 19B illustrates a second image comprising an image of the road marker in FIG. 19B, which has been captured at a second time instant that is a predefined time period after the first time instant.

FIG. 19A illustrates a first image 1910 containing an image 1912 of a road marker, which has been captured by a vehicle-mounted camera at the first time instant. The vehicle-mounted camera is a frontal (forward-facing) camera that captures images of the road in front of the vehicle. FIG. 19B illustrates a second image 1920 containing an image 1922 of the same road marker, which has been captured at the second time instant by the vehicle-mounted camera as the vehicle travels in a forward direction.

In the example of FIGS. 19A and 19B, the location determination module 31 determines the coordinates ($x_m$, $y_m$) of a central pixel of the road marker image 1912 comprised in the first image 1910, as the determined location $L_1$ of the road marker image 1912. The location of the central pixel may, as in the present example, be determined based on the coordinates of the pixels that define the boundary of the road marker image 1912. However, the determined location ($x_m$, $y_m$) of the road marker image is not limited to the location of a central pixel of the road marker image 1912 and may alternatively be defined by the coordinates of any predefined pixel (e.g. a lowest, highest, left- or right-most pixel) of the road marker image 1912. The determined location of the road marker image may alternatively be defined by the coordinates of a plurality of pixels that define at least a portion of the boundary of the road marker image 1912.

In step S520 of FIG. 16, the location prediction module 32 may, as in the example of FIGS. 19A and 19B, predict the location of the (same) road marker 1922 in the second image 1920 by using the determined location ($x_m$, $y_m$) of the road marker image 1912 in the first image, an estimate of the speed of the vehicle, the predefined time period between the first time instant and the second time instant, and the mapping illustrated in FIG. 18. More specifically, the location prediction module 32 may, as in the present embodiment, first use the mapping in FIG. 18 and Y-axis coordinate of the determined location ($x_m$, $y_m$) of the road marker image 1912 in the first image 1910 to determine that the road marker represented by the road marker image 1912 is at a distance $d_m$ from the vehicle along the road (i.e. by determining, using the polynomial function illustrated in FIG. 18, the distance D from vehicle that corresponds to the Y-axis coordinate value $y_m$). The location prediction module 32 may further determine the distance $\Delta d$ travelled by the vehicle during the predefined time period between the capture of the first image and the second image by multiplying the estimated vehicle speed by the predetermined time period. The location prediction module 32 may subsequently predict the location (in the common image coordinate system of the first image 1910 and the second image 1920) of the image of the road marker in the second image 1920, by mapping the distance $d_m - \Delta d$ to a Y-axis location in the image coordinate system of the first and second images, using the mapping illustrated in FIG. 18. As illustrated in the first image 1910 in FIG. 19A, the predicted location $L_p$ of the road marker image in the second image is at coordinate position ($x_m$, $y_p$). It should be noted that in the example of FIG. 19A and FIG. 19B, the predicted location of the road marker image 1922 in the second image 1920 only takes into account the expected shift in the Y-axis position of the road marker image 1912 in the first image 1910.

In the example of FIGS. 19A and 19B, the road marker image detection module 33 performs in step S530 of FIG. 16 a detection of the image of the road marker in a portion 1930 of the second image 1920 at the predicted location ($x_m$, $y_p$). In the present example, the portion 1930 is illustrated as rectangular region centred around the predicted location ($x_m$, $y_p$). However, the shape of the portion 1930 of the second image 1920 is not limited in this respect and may take a different form, for example a rectangle or a circle, which nevertheless has a predefined spatial relationship with the predicted location of the road marker image. In the present example, the detection of the road marker in the portion 1930 of the second image 1920 is determined using the same method as used to determine the location of the road marker image 1912 in the first image 1910. In particular, the boundary of the road marker image 1922 in the portion 1930 of image 1920 is first determined, and a central pixel of the road marker located at ($x_{m2}$, $y_{m2}$) is determined as the location $L_2$ of the road marker image 1922 in image 1920. However, as previously explained in relation to the detection of the road marker image 1912 in the first image 1910, any suitable method can be used to detect the road marker image 1922 in the second image 1920.

In the example of FIGS. 19A and 19B, in step S540 of FIG. 16, the distance estimation module 34 estimates the distance by which the vehicle has travelled along the road during the predefined time period based on the determined location ($x_m$, $y_m$) of the road marker image 1912 in the first image 1910 and the determined location ($x_{m2}$, $y_{m2}$) of the road marker image 1922 in the second image 1920. More specifically, the distance estimation module 34 may, as in the present example, calculate as the estimated distance, the value $d_m - d_{m2}$, wherein $d_{m2}$ is the distance from the vehicle of a portion of the road represented by the Y-axis value $y_{m2}$, and $d_m$ is the distance from the vehicle of a portion of the road represented by the Y-axis value $y_m$.

In step S550 of FIG. 16, the speed calculation module 35 calculates the speed of the vehicle based on the estimated distance at step S540 and the predefined time period, specially by dividing the estimated distance by the predetermined time period. In the present example, the first image 1910 and the second image 1920 are successive images acquired by a camera capturing images at a predefined frame rate, and therefore the predefined time period is calculated as the inverse of the frame rate. However, the first image and the second image need not be successive images captured by the camera, and may be any pair of images that are captured by the vehicle mounted camera at two relatively close time instants such that a common object (such as a road marker) appears in both images.

In step S520 of FIG. 16, the estimate of the vehicle speed that is used to predict the location of the image of the road marker in the second image 1920 may, as in the present example, be a speed of the vehicle which was calculated during the above-described processing of a pair of images previously captured by the camera. That is, an estimate of the vehicle speed, which has been calculated using a pair of images of any given iteration of the method of FIG. 16, may be used as the vehicle speed estimate of step S520 in a subsequent iteration of the method of FIG. 16. However, in other embodiments, the vehicle speed estimate used in step S520 may be obtained by other means, for example, by receiving a measured speed from a speedometer of the vehicle.

It should be noted that, although the present examples employ a mapping (between a first variable, which is indicative of a position in the image coordinate system of a portion of the image, and second variable, which is indicative of a distance from the vehicle of a portion of the road represented by the portion of the image, to predict a location of the road marker image in the second image 1920, in some embodiments, the mapping is not used in step S520, and an alternative method may be used to predict the location of the road marker image in the second image 1920. That is, in some embodiments, the mapping (between a first variable which is indicative of a position in the image coordinate system of a portion of the image, and second variable which is indicative of a distance from the vehicle of a portion of the road represented by the portion of the image) may be used only in step S540, for estimating the distance by which the vehicle has travelled along the road during the predefined time period.

The mapping that is described in relation to step S520 and 540 may be implemented in a number of ways. In the present embodiment, the mapping is provided by a polynomial function relating the first variable (indicative of a position in the image coordinate system of a portion of the image) to the second variable (indicative of a distance from the vehicle of a portion of the road represented by the portion of the image). This method of mapping is independent of the vertical resolution of the image, as any value for the first variable can be transformed into a corresponding value of the second variable. In some embodiments, the mapping may alternatively be implemented as a look-up table relating the first variable to the second variable. Using a look-up table allows the mapping to be performed quickly and with a lower processor burden, as no processor-intensive computations are required. In some embodiments, the mapping may be defined by polylines that relate the first variable to the second variable, each polyline corresponding to a linear function. More specifically, the mapping may be implemented using a look-up table that maps a plurality of non-overlapping ranges of values for the first variable to a respective linear function (corresponding to a polyline). The linear function for a non-overlapping range can be used to map a value in the non-overlapping range to a corresponding value of the second variable.

It should be noted that, although the image processing operations described above with reference to FIGS. 19A and 19B are applied to a pair of images of the road in front of the vehicle that have been captured by a forward-facing camera mounted on the vehicle as the vehicle travels forward along the road, steps S510 to S550 and the previously described mapping may, in an alternative embodiment, be similarly used to calculate the speed of the vehicle by processing a first rear-view image and a second rear-view image that have been captured at two different time instances by a rear-facing camera mounted on the vehicle when the vehicle was travelling in the forward direction. In particular, in the alternative embodiment, the steps performed are almost identical to steps S520 and S540. For example, assuming that the location of the road marker image in the first rear-view image is $(x'_m, y'_m)$, in a case where the mapping in FIG. 18 is used at step S520 to predict the location of the road marker in the second rear-view image, the location prediction module 32 of the alternative embodiment would instead predict the location of the road marker image in the second rear-view image, by mapping the distance $d'_m + \Delta d'$ to a Y-axis location in the image coordinate system (of the rear-view images) using the mapping, wherein distance $d'_m$ is the distance of the road marker represented by the road marker image in the first rear-view image from the vehicle, and $\Delta d'$ is the distance travelled by the vehicle during the predefined time period between the capture of the first rear-view image and the second rear-view image. In addition, at step S540, denoting the determined location of the road marker image in the second rear-view image as $(x'_{m2}, y'_{m2})$, the distance estimation module 34 of the alternative embodiment would instead calculate, as the estimated distance (by which the vehicle has travelled during the predetermined time period), the value $d'_{m2} - d'_m$, wherein $d'_{m2}$ is the distance from the vehicle of a portion of the road represented by the Y-axis value $y'_{m2}$, and $d'_m$ is the distance from the vehicle of a portion of the road represented by the Y-axis value $y'_m$.

In addition, in some embodiments, the vehicle-mounted camera may be a side-view camera that is arranged to capture, as the pair of images, images of the road to a side of the vehicle as the vehicle travels along the road. The side-view camera is preferably a high-speed camera having a sufficiently high frame-rate (e.g. above 30 fps) to ensure that the same road marker can be captured in both images. In this scenario, steps of S510 to S550 may be similarly used to calculate the speed of the vehicle based on the first side-view image and a second side-view image that are captured at two different time instances. In the case that side-view images are used, the mapping that may be used at step S520 and/or step S540 would be a linear mapping that maps a displacement along the X-axis of the image coordinate system (of the first and second side-view images) to a value representative of a distance travelled along the road by the vehicle. For example, assuming that the location of the road marker image in the first side-view image is $(x''_m, y''_m)$, in a case where the mapping is used at step S520 to predict the location of the road marker in the second side-view image, the location prediction module 32 would instead predict the X-axis location of the image of the road marker in the second side-view image, by calculating the value $x''_m - \Delta x''$, wherein $\Delta x''$ is the estimated displacement along the X-axis of the image coordinate system that may be determined using the mapping and a distance travelled by the vehicle during the predefined time period between the capture of the first side-view image and the second side-view image. In addition, at step S540, in the case where the mapping is used to calculate the estimated distance (by which the vehicle has travelled during the predetermined time period), denoting the determined location of the road marker image in the second side-view as $(x''_{m2}, y''_{m2})$, the distance estimation module 34 would instead calculate the estimated distance by determining the value of $x''_m - x''_{m2}$ and mapping the determined value of $x''_m - x''_{m2}$ to a distance representative of a distance travelled along the road by the vehicle by using the mapping.

Embodiments described above are summarised in the following numbered clauses E1 to E23:

E1. A method of determining a speed of a vehicle travelling along a road by processing pairs of images (1910, 1920) of the road that have been captured by a camera mounted on the vehicle, each of the pairs of images (1910, 1920) having a common image coordinate system and comprising a first image (1910) of the road and a second image (1920) of the road, the first image having been captured at a first time instant, and the second image having been captured at a second time instant that is a predefined time period after the first time instant, wherein the first image (1910) and the second image (1920) comprise respective road marker images (1912, 1922) of a road marker on the road, the method comprising processing each of the pairs of images (1910, 1920) by:
  determining (S510) a location ($L_1$), in the image coordinate system, of the road marker image (1912) in the first image (1910);
  predicting (S520) a location ($L_p$), in the image coordinate system, of an image of the road marker in the second image (1920) based on the determined location ($L_1$) of the road marker image (1912), an estimate of the speed of the vehicle, and the predefined time period;
  detecting (S530) an image (1922) of the road marker in a portion (1930) of the second image (1920) at the predicted location ($L_p$);
  estimating (S540) a distance by which the vehicle has travelled along the road during the predefined time period based on the determined location ($L_1$) of the road marker in the first image (1910), and a location ($L_2$) of the detected image (1922) of the road marker in the portion (1930) of the second image (1920); and
  calculating (S550) the speed of the vehicle based on the estimated distance and the predefined time period.

E2. The method according to E1, wherein a calculation consisting of a cross-correlation between a portion of the first image (1910) at the determined location ($L_1$) and a portion of the second image (1920) at the predicted location ($L_p$) is performed, and a result of the calculation is used to detect, and determine the location ($L_2$) of, the image (1922) of the road marker in the portion of the second image (1920), and estimate the distance by which the vehicle has travelled along the road during the predefined time period.

E3. The method according to E1 or E2, wherein the estimate of the speed of the vehicle, which is used to predict the location of the image of the road marker in the second image during processing of a pair of the pairs of images, is one of a speed of the vehicle measured by a speedometer of the vehicle and a speed of the vehicle calculated during the processing of one of the pairs of images previously captured by the camera.

E4. The method according to any one of E1 to E3, wherein the predicted location ($L_p$) of the image of the road marker in the second image (1920) is predicted using a mapping (1800) between a first variable, which is indicative of a position in the image coordinate system of a portion of the image, and second variable, which is indicative of a distance from the vehicle of a portion of the road represented by the portion of the image.

E5. The method according to any one of E1 to E3, wherein estimating the distance by which the vehicle as travelled along the road during the predefined time period is further based on a mapping (1800) between a first variable, which is indicative of a position in the image coordinate system of a portion of the image, and second variable, which is indicative of a distance from the vehicle of a portion of the road represented by the portion of the image.

E6. The method according to E5, wherein estimating the distance based on the mapping (1800) comprises:
  determining, using the determined location ($L_1$) of the road marker image (1912) in the first image (1910) and the mapping (1800), a first value indicative of a distance from the vehicle of a portion of the road represented by the determined location ($L_1$) of the road marker image (1912) in the first image (1910);
  determining, using the determined location ($L_2$) of the road marker image (1922) in the second image (1920) and the mapping (1800), a second value indicative of a distance from the vehicle of a portion of the road represented by the determined location ($L_2$) of the road marker image (1922) in the second image (1920); and
  estimating the distance by which the vehicle has travelled along the road during the predefined time period using the first value and the second value.

E7. The method according to E5 or E6, wherein the predicted location ($L_p$) of the image of the road marker in the second image (1920) is predicted using the mapping (1800).

E8. The method according to any one of E4 to E7, wherein the camera is arranged to capture, as the images, images of the road to a side of the vehicle as the vehicle travels along the road, and the mapping is a linear mapping.

E9. The method according to any one of E4 to E7, wherein the camera is arranged to capture, as the images, images of the road behind or ahead of the vehicle as the vehicle travels along the road, and the mapping is a non-linear mapping.

E10. The method according to E8 or E9, wherein the mapping is one of a polynomial relating the first variable to the second variable, a look-up table relating the first variable to the second variable, and a polyline relating the first variable to the second variable.

E11. The method according to any one of E1 to E10, wherein the location ($L_1$) of the road marker image (1912) in the first image (1910) is determined by:
  generating an LL sub-band image of an $M^{th}$ level of an (M+1)-level discrete wavelet transform, DWT, decomposition of the first image (1910) by iteratively low-pass filtering and down-sampling the first image (1910) M times, where M is an integer equal to or greater than one;
  generating a sub-band image of a $(M+1)^{th}$ level of the (M+1) level DWT decomposition of the first image (1910) by high-pass filtering the LL sub-band image of the $M^{th}$ level, and down-sampling a result of the high-pass filtering;
  generating boundary data indicative of a boundary of the road marker image (1912) of the first image (1910), by determining a boundary of a region of pixels of the sub-band image of the $(M+1)^{th}$ level, the region of pixels being surrounded by pixels of substantially different pixel values to the pixel values of the pixels in the region; and
  determining the location ($L_1$) of the road marker image (1912) in the first image (1910) by upscaling the boundary data of the region of pixels of the sub-band image of the $(M+1)^{th}$ level by a factor of $2^{m+1}$.

E12. The method according to E11, wherein a first low-pass filter (510) having a first sequence (510) of filter coefficients that are symmetrical is used in at least one iteration of the iterative process.

E13. The method according to E12, wherein the filter coefficients in the first sequence of filter coefficients (510) are set to values in a row of Pascal's triangle having the same number of values as an order of the first low-pass filter (310).

E14. The method according to E12 or E13, wherein the high-pass filtering used to generate the sub-band image of the $(M+1)^{th}$ level comprises applying a high-pass filter (320) having a second sequence of filter coefficients (520) that are symmetrical.

E15. The method according to E14, wherein
  alternate filter coefficients in the second sequence of filter coefficients (520) are set to correspondingly located values in a row of Pascal's triangle having the same number of values as an order of the high-pass filter (320), and
  each remaining filter coefficient in the second sequence of filter coefficients (520) is set to a value obtained by multiplying a correspondingly located value in the row of Pascal's triangle by −1.

E16. The method according to any one of E11 to E15, wherein the sub-band image of the $(M+1)^{th}$ level of the (M+1)-level DWT decomposition is one of an LH sub-band image, an HL sub-band image, and an HH sub-band image.

E17. The method according to any one of E1 to E16, wherein generating the sub-band image of the $(M+1)^{th}$ level of the (M+1)-level DWT decomposition of the first image (1910) comprises generating an LH sub-band image of the $(M+1)^{th}$ level of the (M+1)-level DWT decomposition of the first image (1910) by:
  generating a low-pass filtered LL sub-band image by applying a row kernel across the rows of the LL sub-band image of the $M^{th}$ level, the row kernel corresponding to a low-pass filter (310);
  down-sampling the columns of the low-pass filtered LL sub-band image by a factor of two to generate a down-sampled sub-band image;

generating a high-pass filtered LL sub-band image by applying a column kernel across the columns of the down-sampled sub-band image, the column kernel corresponding to a high-pass filter (320); and down-sampling the rows of the high-pass filtered LL sub-band image by a factor of two to generate the LH sub-band image of the $(M+1)^{th}$ level.

E18. The method according to any one of E11 to E16, wherein generating the sub-band image of the $(M+1)^{th}$ level of the (M+1)-level DWT decomposition of the image comprises generating an LH sub-band image of the $(M+1)^{th}$ level of the DWT decomposition of the image by:
generating a high-pass filtered LL sub-band image by applying a column kernel across the columns of the LL sub-band image of the $M^{th}$ level, the column kernel corresponding to a high-pass filter (320);
down-sampling the rows of the high-pass filtered LL sub-band image by a factor of two to generate a down-sampled sub-band image;
generating a low-pass filtered sub-band image by applying a row kernel across the rows of the down-sampled sub-band image of the $M^{th}$ level, the row kernel corresponding to a low-pass filter; and
down-sampling the columns of the low-pass filtered sub-band image by a factor of two to generate the LH sub-band image of the $(M+1)^{th}$ level.

E19. The method according to any one of E11 to E16, wherein generating the sub-band image (930) of the $(M+1)^{th}$ level comprises generating an LH sub-band image of the $(M+1)^{th}$ level of the (M+1)-level DWT decomposition of the image (910) by:
generating a filtered sub-band image by applying a two-dimensional kernel across the LL sub-band image of the $M^{th}$ level, the two-dimensional kernel being separable into a product of a row kernel and a column kernel, the row-kernel defining a low-pass filter and the column kernel defining a high pass filter; and down-sampling rows and the columns of the filtered sub-band image by a factor of two.

E20. The method according to any one of E11 to E19, wherein the road marker is a Botts' dot, and the sub-band image of the $(M+1)^{th}$ level of the (M+1)-level DWT decomposition is an LH sub-band image of the $(M+1)^{th}$ level of the (M+1)-level DWT decomposition.

E21. The method according to any one of E11 to E20, wherein generating the boundary data comprises:
determining, in the sub-band image of the $(M+1)^{th}$ level, a pixel location of a pixel whose pixel value exceeds a predetermined threshold; and
executing a contour tracing algorithm using the determined pixel to identify the boundary of the region (1420) of pixels, wherein the boundary separates pixels of the region (1420) which are adjacent to the boundary and have pixel values above the predetermined threshold, from pixels outside the region (1420) which are adjacent to the boundary and have pixel values below the predetermined threshold.

E22. A computer program (245) comprising computer-readable instructions which, when executed by a processor (220), cause the processor (220) to execute a method according to at least one of E1 to E21.

E23. An apparatus (30) for determining a speed of a vehicle travelling along a road by processing pairs of images (1910, 1920) of the road that have been captured by a camera mounted on the vehicle, each of the pairs of images (1910, 1920) having a common image coordinate system and comprising a first image (1910) of the road and a second image (1920) of the road, the first image (1910) having been captured at a first time instant, and the second image (1920) having been captured at a second time instant that is a predefined time period after the first time instant, wherein the first image (1910) and the second image (1920) comprise respective road marker images (1912, 1922) of a road marker on the road, the apparatus comprising:
a location determination module (31) arranged to determine a location ($L_1$), in the image coordinate system, of the road marker image (1912) in the first image (1910);
a location prediction module (32) arranged to predict a location ($L_p$), in the image coordinate system, of an image (1922) of the road marker in the second image (1920) based on the determined location ($L_1$) of the road marker image (1912), an estimate of the speed of the vehicle, and the predefined time period;
a road marker image detection module (33) arranged to detect an image (1922) of the road marker in a portion (1930) of the second image (1920) at the predicted location ($L_p$);
a distance estimation module (34) arranged to estimate a distance by which the vehicle has travelled along the road during the predefined time period based on the determined location ($L_1$) of the road marker in the first image (1910), and a location ($L_2$) of the detected image (1922) of the road marker in the portion (1930) of the second image (1920); and
a speed calculation module (35) arranged to calculate the speed of the vehicle based on the estimated distance and the predefined time period.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Software embodiments presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the embodiments presented herein in any way. It is also to be understood that any procedures recited in the claims need not be performed in the order presented.

While this specification contains many specific embodiment details, these should not be construed as limitations on the scope of any inventions or of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements and features discussed only in connection with one embodiment are not intended to be excluded from a similar role in other embodiments or embodiments.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

The invention claimed is:

1. A method of determining a speed of a vehicle travelling along a road by processing pairs of images of the road that have been captured by a camera mounted on the vehicle, each of the pairs of images having a common image coordinate system and including a first image of the road and a second image of the road, the first image having been captured at a first time instant, the second image having been captured at a second time instant that is a predefined time period after the first time instant, and the first image and the second image including respective road marker images of a road marker on the road, the method comprising processing each of the pairs of images by:

determining a location, in the image coordinate system, of the road marker image in the first image by:
generating an LL sub-band image of an Mth level of an (M+1)-level discrete wavelet transform (DWT) decomposition of the first image by iteratively low-pass filtering and down-sampling the first image M times, wherein M is an integer equal to or greater than one;
generating a sub-band image of an (M+1)th level of the (M+1)-level DWT decomposition of the first image by high-pass filtering the LL sub-band image of the Mth level, and down-sampling a result of the high-pass filtering;
generating boundary data indicative of a boundary of the road marker image of the first image, by determining a boundary of a region of pixels of the sub-band image of the (M+1)th level, the region of pixels being surrounded by pixels of different pixel values to the pixel values of the pixels in the region; and determining the location of the road marker image in the first image by upscaling the boundary data of the region of pixels of the sub-band image of the (M+1)th level by a factor of 2M+1;

predicting a location, in the image coordinate system, of an image of the road marker in the second image based on the determined location of the road marker image, an estimate of the speed of the vehicle, and the predefined time period;

detecting an image of the road marker in a portion of the second image at the predicted location;

estimating a distance by which the vehicle has travelled along the road during the predefined time period based on the determined location of the road marker in the first image, and a location of the detected image of the road marker in the portion of the second image; and calculating the speed of the vehicle based on the estimated distance and the predefined time period.

2. The method according to claim 1, wherein a calculation consisting of a cross-correlation between a portion of the first image at the determined location and a portion of the second image at the predicted location is performed, and a result of the calculation is used to detect, and determine the location of, the image of the road marker in the portion of the second image, and estimate the distance by which the vehicle has travelled along the road during the predefined time period.

3. The method according to claim 1, wherein the estimate of the speed of the vehicle, which is used to predict the location of the image of the road marker in the second image during processing of a pair of the pairs of images, is one of a speed of the vehicle measured by a speedometer of the vehicle and a speed of the vehicle calculated during the processing of one of the pairs of images previously captured by the camera.

4. The method according to claim 1, wherein the predicted location of the image of the road marker in the second image is predicted using a mapping between a first variable, which is indicative of a position in the image coordinate system of a portion of the image, and second variable, which is indicative of a distance from the vehicle of a portion of the road represented by the portion of the image.

5. The method according to claim 4, wherein the camera is arranged to capture, as the images:
images of the road to a side of the vehicle as the vehicle travels along the road, and the mapping is a linear mapping; or
images of the road behind or ahead of the vehicle as the vehicle travels along the road, and the mapping is a non-linear mapping.

6. The method according to claim 5, wherein the mapping is one of a polynomial relating the first variable to the second variable, a look-up table relating the first variable to the second variable, and a polyline relating the first variable to the second variable.

7. The method according to claim 1, wherein estimating the distance by which the vehicle as travelled along the road during the predefined time period is further based on a mapping between a first variable, which is indicative of a position in the image coordinate system of a portion of the image, and second variable, which is indicative of a distance from the vehicle of a portion of the road represented by the portion of the image.

8. The method according to claim 7, wherein estimating the distance based on the mapping includes:
determining, using the determined location of the road marker image in the first image and the mapping, a first value indicative of a distance from the vehicle of a portion of the road represented by the determined location of the road marker image in the first image;
determining, using the determined location of the road marker image in the second image and the mapping, a second value indicative of a distance from the vehicle of a portion of the road represented by the determined location of the road marker image in the second image; and
estimating the distance by which the vehicle has travelled along the road during the predefined time period using the first value and the second value.

9. The method according to claim 7, wherein the predicted location of the image of the road marker in the second image is predicted using the mapping.

10. The method according to claim 1, wherein a first low-pass filter having a first sequence of filter coefficients that are symmetrical is used in at least one iteration of the iterative process.

11. The method according to claim 10, wherein the filter coefficients in the first sequence of filter coefficients are set to values in a row of Pascal's triangle having the same number of values as an order of the first low-pass filter.

12. The method according to claim 1, wherein generating the sub-band image of the (M+1)th level of the (M+1)-level DWT decomposition of the first image includes generating an LH sub-band image of the (M+1)th level of the (M+1)-level DWT decomposition of the first image by one of:
a first process including:
generating a low-pass filtered LL sub-band image by applying a row kernel across the rows of the LL sub-band image of the Mth level, the row kernel corresponding to a low-pass filter;
down-sampling the columns of the low-pass filtered LL sub-band image by a factor of two to generate a down-sampled sub-band image;
generating a high-pass filtered LL sub-band image by applying a column kernel across the columns of the down-sampled sub-band image, the column kernel corresponding to a high-pass filter; and
down-sampling the rows of the high-pass filtered LL sub-band image by a factor of two to generate the LH sub-band image of the (M+1)th level;
a second process including:
generating a high-pass filtered LL sub-band image by applying a column kernel across the columns of the LL sub-band image of the Mth level, the column kernel corresponding to a high-pass filter;
down-sampling the rows of the high-pass filtered LL sub-band image by a factor of two to generate a down-sampled sub-band image;
generating a low-pass filtered sub-band image by applying a row kernel across the rows of the down-sampled sub-band image of the Mth level, the row kernel corresponding to a low-pass filter; and
down-sampling the columns of the low-pass filtered sub-band image by a factor of two to generate the LH sub-band image of the (M+1)th level; and
a third process including:
generating a filtered sub-band image by applying a two-dimensional kernel across the LL sub-band image of the Mth level, the two-dimensional kernel being separable into a product of a row kernel and a column kernel, the row-kernel defining a low-pass filter and the column kernel defining a high pass filter; and down-sampling rows and the columns of the filtered sub-band image by a factor of two.

13. A non-transitory computer-readable medium comprising instructions that, when executed by a processor, cause the processor to execute a method of determining a speed of a vehicle travelling along a road by processing pairs of images of the road that have been captured by a camera mounted on the vehicle, each of the pairs of images having a common image coordinate system and including a first image of the road and a second image of the road, the first image having been captured at a first time instant, the second image having been captured at a second time instant that is a predefined time period after the first time instant, and the first image and the second image including respective road marker images of a road marker on the road, the method including processing each of the pairs of images by:

determining a location, in the image coordinate system, of the road marker image in the first image by:

generating an LL sub-band image of an Mth level of an (M+1)-level discrete wavelet transform (DWT) decomposition of the first image by iteratively low-pass filtering and down-sampling the first image M times, wherein M is an integer equal to or greater than one;

generating a sub-band image of an (M+1)th level of the (M+1)-level DWT decomposition of the first image by high-pass filtering the LL sub-band image of the Mth level, and down-sampling a result of the high-pass filtering;

generating boundary data indicative of a boundary of the road marker image of the first image, by determining a boundary of a region of pixels of the sub-band image of the (M+1) th level, the region of pixels being surrounded by pixels of different pixel values to the pixel values of the pixels in the region; and determining the location of the road marker image in the first image by upscaling the boundary data of the region of pixels of the sub-band image of the (M+1) th level by a factor of 2M+1;

predicting a location, in the image coordinate system, of an image of the road marker in the second image based on the determined location of the road marker image, an estimate of the speed of the vehicle, and the predefined time period;

detecting an image of the road marker in a portion of the second image at the predicted location;

estimating a distance by which the vehicle has travelled along the road during the predefined time period based on the determined location of the road marker in the first image, and a location of the detected image of the road marker in the portion of the second image; and calculating the speed of the vehicle based on the estimated distance and the predefined time period.

14. An apparatus for determining a speed of a vehicle travelling along a road by processing pairs of images of the road that have been captured by a camera mounted on the vehicle, each of the pairs of images having a common image coordinate system and including a first image of the road and a second image of the road, the first image having been captured at a first time instant, the second image having been captured at a second time instant that is a predefined time period after the first time instant, and the first image and the second image including respective road marker images of a road marker on the road, the apparatus comprising:

memory hardware configured to store instructions; and processor hardware configured to execute the instructions stored by the memory hardware, wherein the instructions include processing each of the pairs of images by:

determining a location, in the image coordinate system, of the road marker image in the first image by:

generating an LL sub-band image of an Mth level of an (M+1)-level discrete wavelet transform (DWT) decomposition of the first image by iteratively low-pass filtering and down-sampling the first image M times, wherein M is an integer equal to or greater than one;

generating a sub-band image of an (M+1)th level of the (M+1)-level DWT decomposition of the first image by high-pass filtering the LL sub-band image of the Mth level, and down-sampling a result of the high-pass filtering;

generating boundary data indicative of a boundary of the road marker image of the first image, by determining a boundary of a region of pixels of the sub-band image of the (M+1)th level, the region of pixels being surrounded by pixels of different pixel values to the pixel values of the pixels in the region; and determining the location of the road marker image in the first image by upscaling the boundary data of the region of pixels of the sub-band image of the (M+1) th level by a factor of 2M+1;

predicting a location, in the image coordinate system, of an image of the road marker in the second image based on the determined location of the road marker image, an estimate of the speed of the vehicle, and the predefined time period;

detecting an image of the road marker in a portion of the second image at the predicted location;

estimating a distance by which the vehicle has travelled along the road during the predefined time period based on the determined location of the road marker in the first image, and a location of the detected image of the road marker in the portion of the second image; and calculating the speed of the vehicle based on the estimated distance and the predefined time period.

* * * * *